(12) United States Patent  
Ohno

(10) Patent No.: US 8,004,550 B2
(45) Date of Patent: Aug. 23, 2011

(54) LIGHT-EMITTING ELEMENT HEAD, IMAGE FORMING APPARATUS AND SIGNAL SUPPLY METHOD

(75) Inventor: Seiji Ohno, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 142 days.

(21) Appl. No.: 12/468,278

(22) Filed: May 19, 2009

(65) Prior Publication Data

US 2010/0118100 A1    May 13, 2010

(30) Foreign Application Priority Data

Nov. 11, 2008    (JP) .................................. 2008-288389

(51) Int. Cl.
*B41J 2/435*    (2006.01)
*B41J 2/47*    (2006.01)

(52) U.S. Cl. ........................................ 347/237; 347/247

(58) Field of Classification Search .................. 347/237, 347/238, 247
See application file for complete search history.

(56) References Cited

U.S. PATENT DOCUMENTS 6,323,887 B1 *   11/2001   Shiraishi et al. ............. 347/115
6,442,361 B1 *   8/2002   Shiraishi et al. ............. 399/130
6,624,838 B2 *   9/2003   Sekiya et al. ................. 347/237

FOREIGN PATENT DOCUMENTS

| EP | 2006918 | 12/2008 |
| JP | 2001-219596 | 8/2001 |
| JP | 2007-160930 | 6/2007 |
| JP | 2008-182010 | 8/2008 |

* cited by examiner

*Primary Examiner* — Hai C Pham
(74) *Attorney, Agent, or Firm* — Fildes & Outland, P.C.

(57) ABSTRACT

The light-emitting element head includes: a first signal supply unit supplying a first signal for sequentially specifying a plurality of light-emitting elements one by one as a control target for control in common to light-emitting element chips; a second signal supply unit supplying second signals for giving an instruction to emit or not to emit light to one of the elements specified as the control target to a set of light-emitting element chips so that each of the signals is supplied in common to plural light-emitting element chips belonging to each of N groups into which the set of chips are divided; and an enable signal supply unit that supplies enable signals for allowing the set of chips to receive the second signals which are different from one another so that the enable signals are supplied respectively to the chips belonging to each of the N groups.

17 Claims, 12 Drawing Sheets

LIGHT-EMITTING ELEMENT HEAD, IMAGE FORMING APPARATUS AND SIGNAL SUPPLY METHOD

CROSS REFERENCE TO RELATED APPLICATIONS

This application is based on and claims priority under 35 USC §119 from Japanese Patent Application No. 2008-288389 filed Nov. 11, 2008.

BACKGROUND

1. Technical Field

The present invention relates to a light-emitting element head in which plural light-emitting element chips are arrayed, image forming apparatus including a light-emitting element head in which plural light-emitting element chips are arrayed, and a signal supply method.

2. Related Art

In an electrophotographic image forming apparatus such as a printer, a copy machine or a facsimile machine, an image is formed on a recording paper sheet as follows. Firstly, an electrostatic latent image is formed on a charged photoconductor by causing an optical recording unit to emit light on the basis of image information. Then, the electrostatic latent image is made visible by being developed with toner. Lastly, the toner image is transferred on and fixed to the recording paper sheet. As such an optical recording unit, in addition to an optical-scanning recording unit that performs exposure by laser scanning in a first scan direction using a laser beam, an optical recording unit using the following light-emitting element head has been employed in recent years. This light-emitting element head includes a large number of light-emitting element chips arrayed in a first scan direction, and each light-emitting element chip includes a light-emitting element array formed of light-emitting elements such as light emitting diodes (LEDs) arrayed in a line.

Such a light-emitting element head including a large number of light-emitting element chips arrayed thereon requires as many lighting signals as correspond to the number of light-emitting element chips. Accordingly, in the light-emitting element head, the number of lighting signal bus lines increases as the number of light-emitting element chips increases. In addition, the number of current buffer circuits each having a large current drive capability also increases with increase in the number of light-emitting element chips since the lighting signals supply a current to the light-emitting elements.

Hence, a light-emitting element head including a large number of light-emitting element chips has the following problems: the size of a drive IC of the light-emitting element head increases as the number of light-emitting element chips increases in the light-emitting element head; and the printed circuit board of the light-emitting element head needs to have a larger width in order to allow a large number of low-resistance lighting signal bus lines to be arranged thereon. The width of the printed circuit board may be reduced by employing a multi-layer printed circuit board, which however causes increase in cost.

SUMMARY

According to an aspect of the present invention, there is provided a light-emitting element head including: a set of light-emitting element chips each having plural light-emitting elements; a lighting signal supply unit that supplies the set of light-emitting element chips with a lighting signal for causing the plural light-emitting elements included in each of the light-emitting element chips to emit light; a first control signal supply unit that supplies a first control signal in common to the light-emitting element chips, the first control signal being a signal for sequentially specifying the plural light-emitting elements included in each of the light-emitting element chips one by one as a control target for controlling whether or not to emit light; a second control signal supply unit that supplies second control signals to the set of light-emitting element chips so that each of the second control signals is supplied in common to plural light-emitting element chips belonging to each of N groups, each of the second control signals being a signal for giving an instruction to emit light or not to emit light to one of the light-emitting elements that is specified as the control target on the basis of the first control signal in each of the light-emitting element chips, the set of light-emitting element chips being divided into the N groups, where N is an integer of 2 or more; and a light-emission enable signal supply unit that supplies plural light-emission enable signals to the set of light-emitting element chips so that the light-emission enable signals are supplied respectively to the plural light-emitting element chips belonging to each of the N groups, the light-emission enable signals being signals for allowing the set of light-emitting element chips to receive the second control signals, the light-emission enable signals being different from one another.

BRIEF DESCRIPTION OF THE DRAWINGS

Exemplary embodiment (s) of the present invention will be described in detail based on the following figures, wherein.

DETAILED DESCRIPTION

First Exemplary Embodiment

Figure 1:
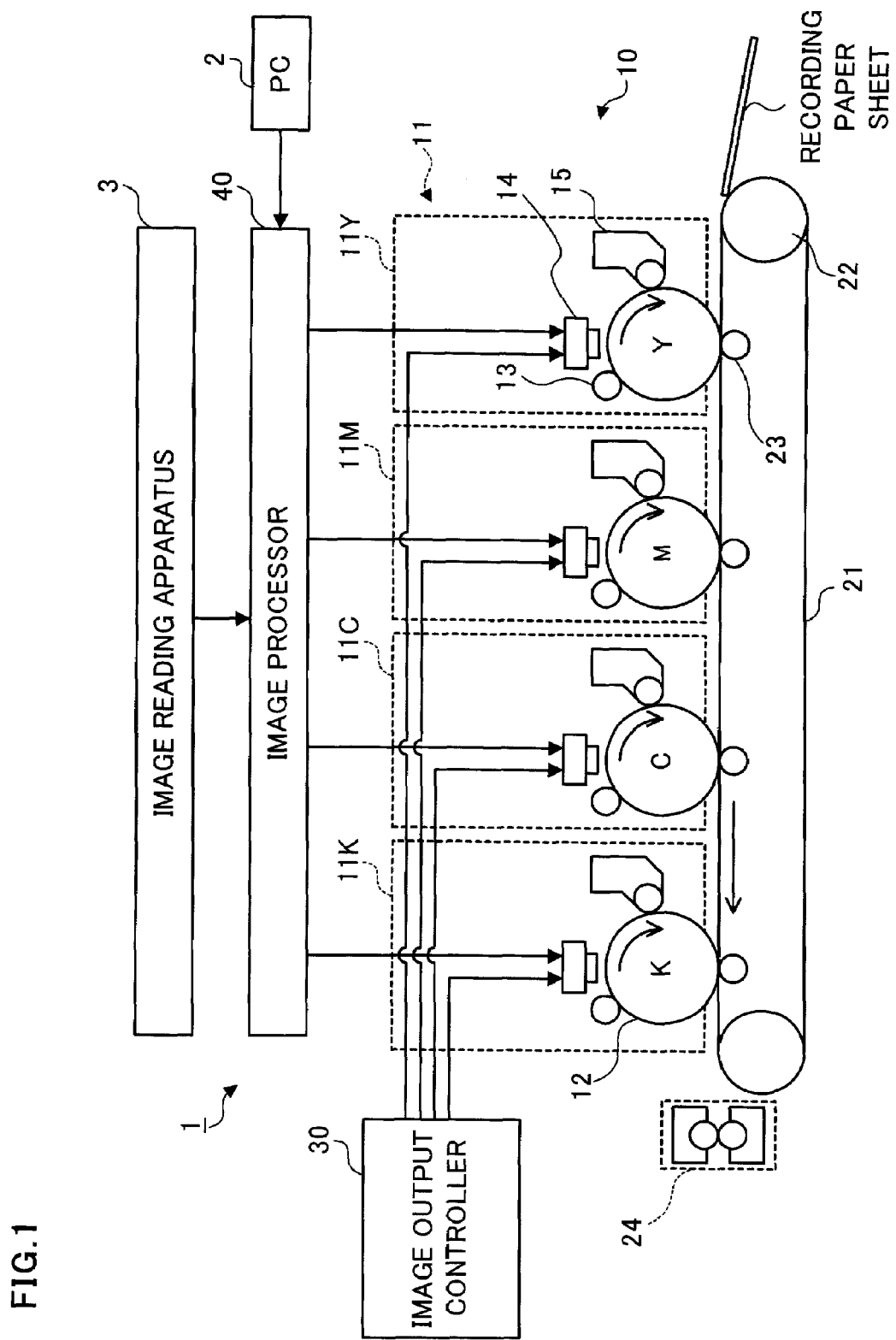
FIG. 1 shows an overall configuration of an image forming apparatus to which the first exemplary embodiment is to be applied.

FIG. 1 shows an overall configuration of an image forming apparatus to which the first exemplary embodiment is to be applied.

The image forming apparatus 1 shown in FIG. 1 is generally called a tandem type image forming apparatus. The image forming apparatus 1 includes an image processing system 10, an image output controller 30 and an image processor 40. The image processing system 10 forms an image in accordance with different color tone datasets. The image output controller 30 controls the image processing system 10. The image processor 40, which is connected to devices such as a personal computer (PC) 2 and an image reading apparatus 3, performs predetermined image processing on image data received from the above devices.

The image processing system 10 includes image forming units 11. The image forming units 11 are formed of multiple engines arranged in parallel at intervals in the horizontal direction. Specifically, the image forming units 11 are composed of four units: a yellow (Y) image forming unit 11Y, a magenta (M) image forming unit 11M, a cyan (C) image forming unit 11C and a black (K) image forming unit 11K. Each of the image forming units 11Y, 11M, 11C and 11K includes a photoconductive drum 12, a charging device 13, an exposure device 14 and a developing device 15. On the photoconductive drum 12 as an example of an image carrier, an electrostatic latent image is formed and thus a toner image is formed. The charging device 13 as an example of a charging unit uniformly charges the outer surface of the photoconductive drum 12. The exposure device 14 as an example of an exposure unit exposes the photoconductive drum 12 charged by the charging device 13. The developing device 15 as an example of a developing unit develops a latent image formed by the exposure device 14. In addition, the image processing system 10 further includes a paper sheet transport belt 21, a drive roll 22, transfer rolls 23 and a fixing device 24. The paper sheet transport belt 21 transports a recording paper sheet so that color toner images (images) respectively formed on the photoconductive drums 12 of the image forming units 11Y, 11M, 11C and 11K are transferred on the recording paper sheet by multilayer transfer. Here, the recording paper sheet is an example of a transferred body. The drive roll 22 drives the paper sheet transport belt 21. Each transfer roll 23 as an example of a transfer unit transfers the toner image formed on the corresponding photoconductive drum 12 onto a recording paper sheet. The fixing device 24 fixes the toner images to the recording paper sheet.

Figure 2:
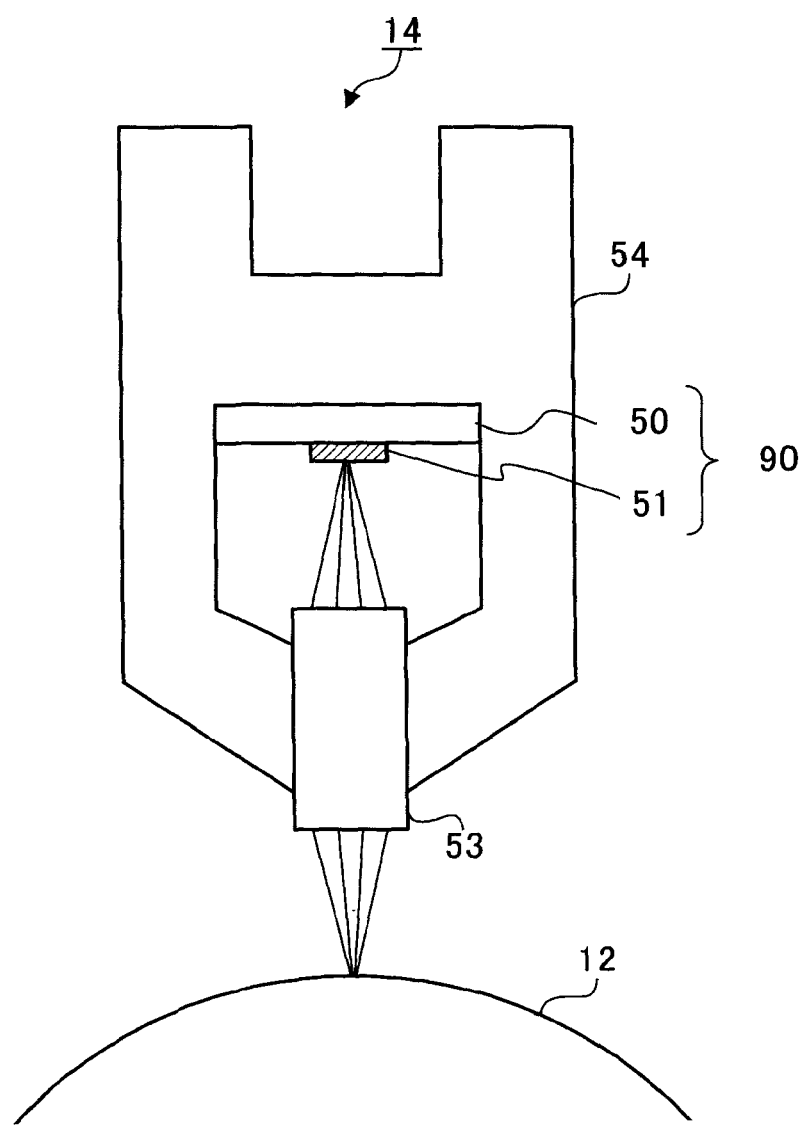
FIG. 2 shows a structure of the exposure device to which the first exemplary embodiment is applied.

FIG. 2 shows a structure of the exposure device 14 to which the first exemplary embodiment is applied. The exposure device 14 includes light-emitting element chips 51, a printed circuit board 50 and a rod lens array 53. Each light-emitting element chip 51 includes multiple light-emitting elements arrayed in a line. The printed circuit board 50 supports the light-emitting element chips 51. In addition, a circuit that performs drive control on the light-emitting element chips 51 is mounted on the printed circuit board 50. The rod lens array 53 focuses a light output emitted by the light-emitting elements onto the photoconductive drum 12. The printed circuit board 50 and the rod lens array 53 are held by a housing 54.

On the printed circuit board 50, multiple light-emitting element chips 51 are arrayed so that as many light-emitting elements as the number of pixels are arrayed in the first scan direction. In this description, the light-emitting element chips 51 and the printed circuit board 50 will be collectively referred to as a light-emitting element head 90.

Figures 3A, 3B:
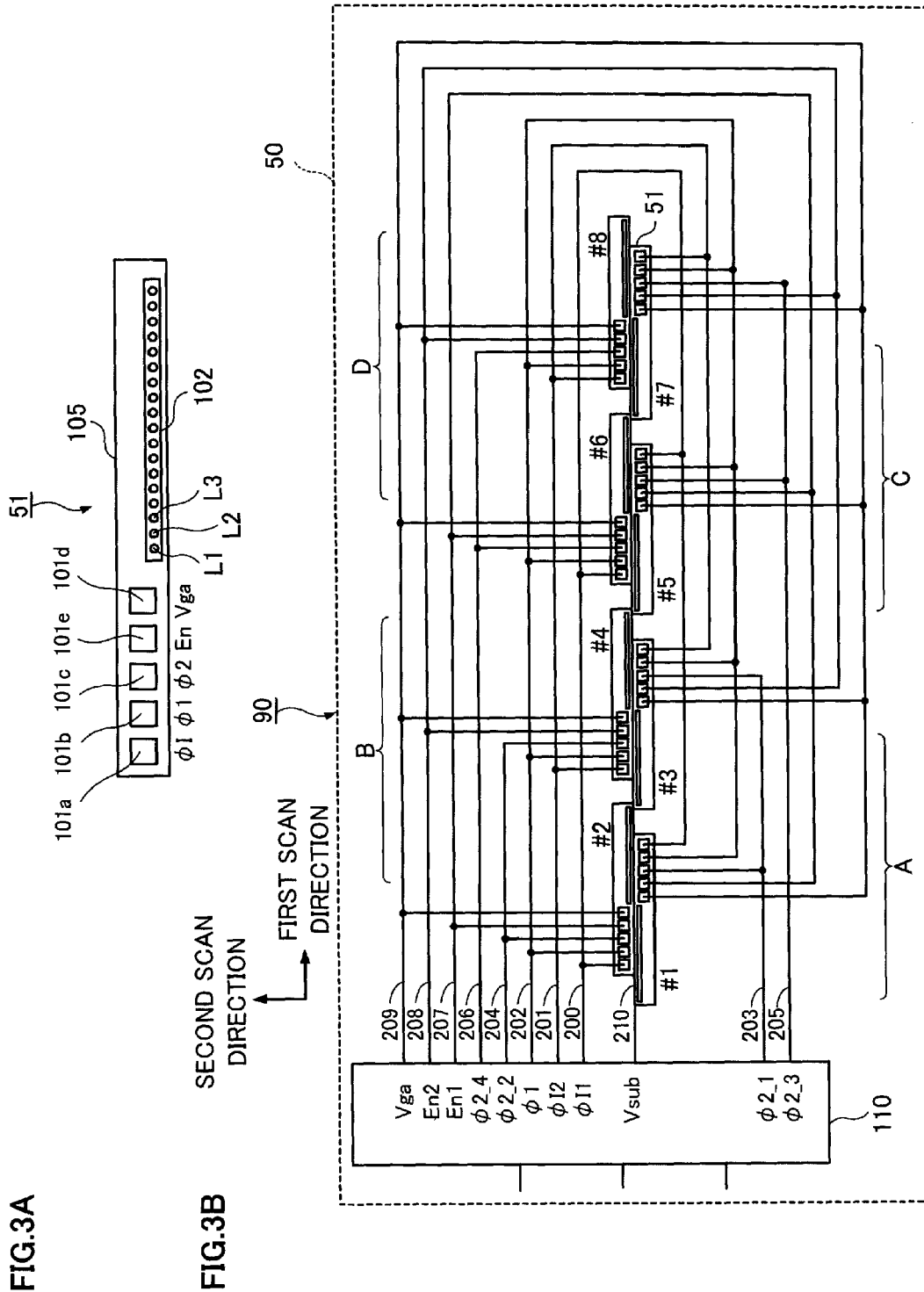
FIG. 3A is a schematic view for explaining a structure of each light-emitting element chip to which the first exemplary embodiment is applied.
FIG. 3B is a schematic view for explaining a configuration of the light-emitting element head in the first exemplary embodiment.

FIG. 3A is a schematic view for explaining a structure of each light-emitting element chip 51 to which the first exemplary embodiment is applied. The light-emitting element chip 51 includes a substrate 105, a light-emitting thyristor array 102 and terminals 101a to 101e. The light-emitting thyristor array 102 is formed of light-emitting thyristors L1, L2, L3, . . . , which are an example of the light-emitting elements. The light-emitting thyristors L1, L2, L3, . . . , are arrayed in a line at equal intervals along a longer side of the rectangular substrate 105.

Among the terminals, the lighting signal terminal 101a is supplied with a lighting signal ϕI for applying a voltage for causing the light-emitting thyristors L1, L2, L3, to emit light. The first clock signal terminal 101b is supplied with a first clock signal ϕ1 as an example of a first control signal, for sequentially specifying the light-emitting thyristors L1, L2, L3, . . . , as targets for controlling whether or not to emit light. The second clock signal terminal 101c is supplied with a second clock signal ϕ2 as an example of a second control signal, for giving an instruction to emit light or not to emit light to any of the light-emitting thyristors L1, L2, L3, . . . , which is specified as the control target based on the first clock signal ϕ1. The power supply terminal 101d is supplied with a power supply voltage Vga. The light-emission enable signal terminal 101e is supplied with a light-emission enable signal En for allowing the light-emitting element chip 51 to receive the instructions to emit light or not to emit light.

FIG. 3B is a schematic view for explaining a configuration of the light-emitting element head 90 in the first exemplary embodiment. The light-emitting element head 90 includes: the printed circuit board 50; the multiple light-emitting element chips 51 on the printed circuit board 50; and a signal generating circuit 110. The signal generating circuit 110 supplies the multiple light-emitting element chips 51 with signals for controlling light-emitting operations of the light-emitting element chips 51. FIG. 3B shows, as an example, the light-emitting element head 90 having eight light-emitting element chips 51 (#1 to #8). In the light-emitting element head 90, the eight light-emitting element chips 51 are arrayed in a zigzag pattern in which each adjacent two of the light-emitting element chips 51 are faced each other so that the light-emitting thyristors L1, L2, L3, . . . , are arrayed in a line with equal intervals in a first scan direction.

After writing (exposing to form) an image segment corresponding to each line that extends in the first scan direction on the photosensitive drum 12, the light-emitting element head 90 writes another image segment corresponding to the next line on the photoconductive drum 12 which has rotated in the second scan direction. By repeating the writing operations in this way, the light-emitting element head 90 forms an image on the photoconductive drum 12.

In the first exemplary embodiment, the eight light-emitting element chips 51 are divided into four groups each formed of two chips, as an example. Specifically, the four groups are: an A group of #1 and #3 of the light-emitting element chips 51; a B group of #2 and #4; a C group of #5 and #7; and a D group of #6 and #8. Note that all the light-emitting element chips 51 have the same structure.

From image signals (not shown in the figure) supplied by the image processor 40 provided in the image forming apparatus 1, and a synchronizing signal and the like (not shown in the figure) supplied by the image output controller 30, the signal generating circuit 110 generates the signals for controlling the light-emitting operations of the light-emitting element chips 51. Specifically, the signal generating circuit 110, as an example of a first control signal supply unit, generates the first clock signal p1 for sequentially specifying the light-emitting thyristors L1, L2, L3, . . . , as targets for controlling whether or not to emit light. In addition, the signal generating circuit 110, as an example of a second control signal supply unit, also generates second clock signals φ2 for setting the light-emitting thyristors L1, L2, L3, . . . , ready to emit light. Moreover, the signal generating circuit 110, as an example of a lighting signal supply unit, also generates lighting signals φI for applying a voltage for causing the light-emitting thyristors L1, L2, L3, . . . , to emit light. In addition, the signal generating circuit 110, as an example of a light-emission enable signal supply unit, also generates light-emission enable signals En for allowing the light-emitting element chips 51 to receive the instructions to emit light or not to emit light.

In this example, four second clock signals φ2 different from each other, that is, a 2_1-th clock signal φ2_1, a 2_2-th clock signal φ2_2, a 2_3-th clock signal φ2_3 and a 2_4-th clock signal φ2_4, are used. Meanwhile, two lighting signals φI, that is, a first lighting signal φI1 and a second lighting signal φI2, are used.

Figure 4:
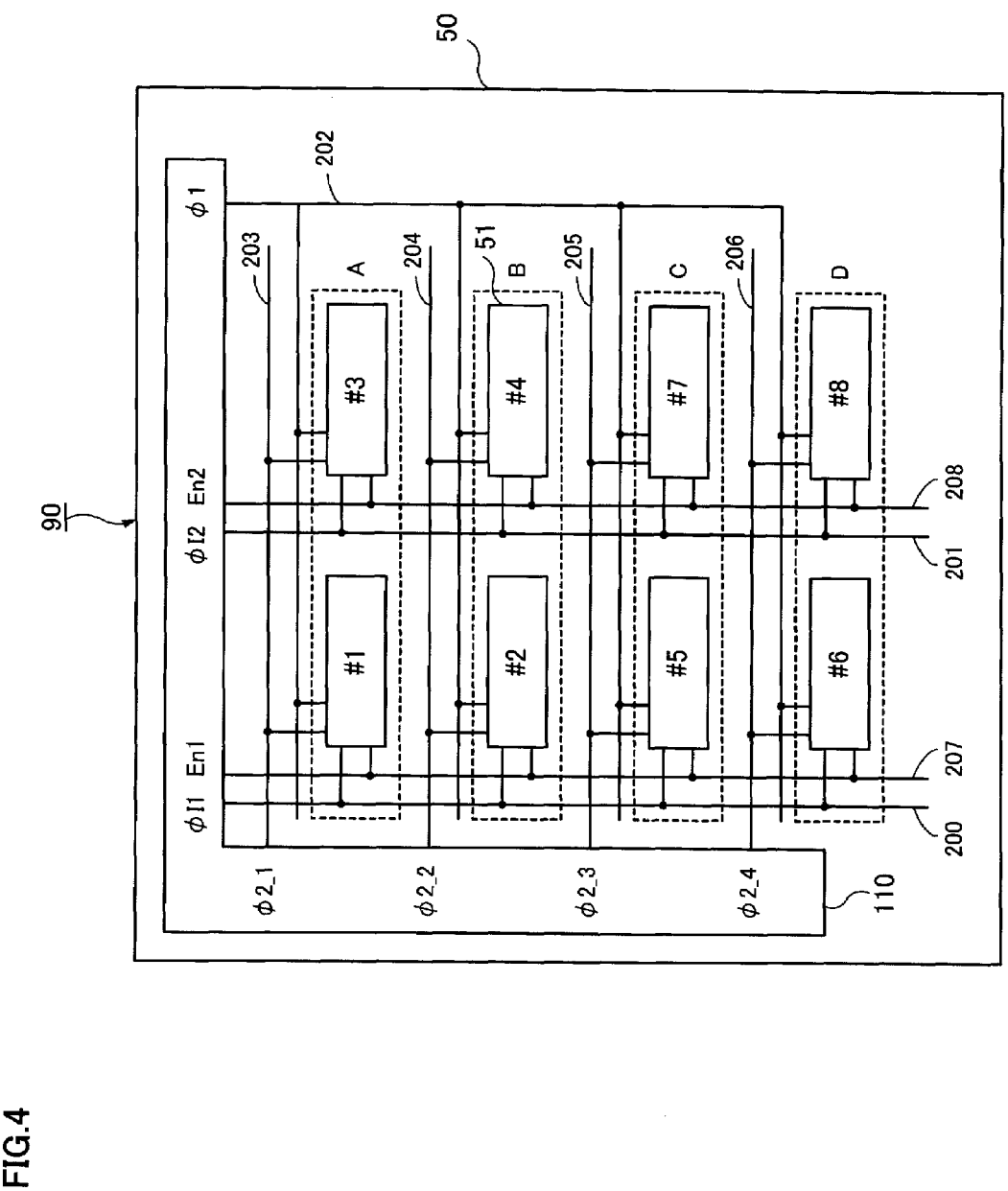
FIG. 4 is a circuit diagram of the light-emitting element head.

FIG. 4 is a circuit diagram of the light-emitting element head 90 shown in FIG. 3B. By rearranging the light-emitting element chips 51 in a matrix, FIG. 4 schematically shows the connection relation of the eight light-emitting element chips 51 (#1 to #8) to the signal bus lines, which are shown in FIG. 3B. Note that, the connection relation of the light-emitting element chips 51 to the signal bus lines is maintained in FIG. 4.

As shown in FIGS. 3B and 4, the signal generating circuit 110 supplies the first clock signal φ1 in common to all the light-emitting element chips 51 through a first clock signal bus line 202.

The signal generating circuit 110 supplies the 2_1-th clock signal φ2_1 to #1 and #3 of the light-emitting element chips 51, which belong to the A group, through a 2_1-th clock signal bus line 203. The signal generating circuit 110 supplies the 2_2-th clock signal φ2_2 to #2 and #4 of the light-emitting element chips 51, which belong to the B group, through a 2_2-th clock signal bus line 204. The signal generating circuit 110 supplies the 2_3-th clock signal φ2_3 to #5 and #7 of the light-emitting element chips 51, which belong to the C group, through a 2_3-th clock signal bus line 205. The signal generating circuit 110 supplies the 2_4-th clock signal φ2_4 to #6 and #8 of the light-emitting element chips 51, which belong to the D group, through a 2_4-th clock signal bus line 206.

In other words, the signal generating circuit 110 supplies one of the second clock signals φ2 in common to the light-emitting element chips 51 belonging to the same group, while supplying the different second clock signals φ2 to the light-emitting element chips 51 belonging to the different groups, respectively.

On the other hand, the signal generating circuit 110 supplies the first lighting signal φI1 to #1, #2, #5 and #6 of the light-emitting element chips 51, which respectively belong to the A to D groups, through a first lighting signal bus line 200. Meanwhile, the signal generating circuit 110 supplies the second lighting signal φI2 to #3, #4, #7 and #8 of the light-emitting element chips 51, which respectively belong to the A to D groups, through a second lighting signal bus line 201.

In other words, the signal generating circuit 110 supplies the lighting signals φI, which are different from each other, even to the respective light-emitting element chips 51 belonging to the same group, while supplying one of the lighting signals φI in common to the light-emitting element chips 51 respectively belonging to the groups different from one another.

In addition, the signal generating circuit 110 supplies a first light-emission enable signal En1 to #1, #2, #5 and #6 of the light-emitting element chips 51, which respectively belong to the A to D groups, through a first light-emission enable signal bus line 207. Meanwhile, the signal generating circuit 110 supplies a second light-emission enable signal En2 to #3, #4, #7 and #8 of the light-emitting element chips 51, which respectively belong to the A to D groups, through a second light-emission enable signal bus line 208.

In other words, as with the lighting signals φI, the signal generating circuit 110 supplies the light-emission enable signals En, which are different from each other, even to the respective light-emitting element chips 51 belonging to the same group, while supplying one of the light-emission enable signals En in common to the light-emitting element chips 51 respectively belonging to the groups different from one another.

In addition, as shown in FIG. 3B, the signal generating circuit 110 supplies the power supply voltage Vga to all the light-emitting element chips 51 through a power supply bus line 209. Moreover, the signal generating circuit 110 supplies a reference voltage Vsub to all the light-emitting element chips 51 through a reference voltage bus line 210. Note that the power supply bus line 209 and the reference voltage bus line 210 are not shown in FIG. 4.

The signal generating circuit 110 may be an LSI such as an application specific integrated circuit (ASIC), for example.

Figure 5:
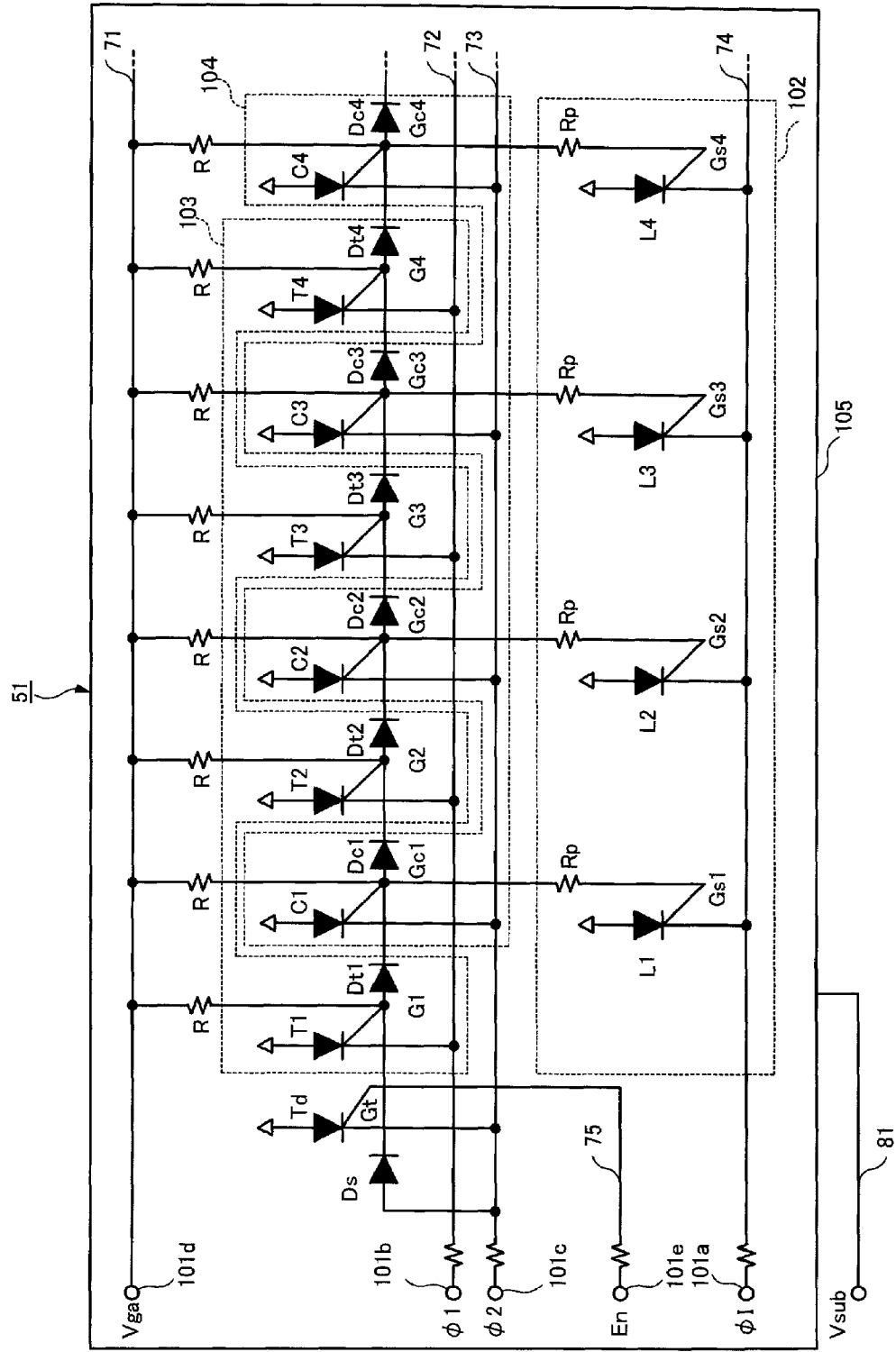
FIG. 5 is a schematic view of an equivalent circuit and a planar layout of each light-emitting element chip.

FIG. 5 is a schematic view of an equivalent circuit and a planar layout of each light-emitting element chip 51.

The light-emitting element chip 51 includes: the substrate 105; the light-emitting thyristor array 102 formed of the light-emitting thyristors L1, L2, L3, . . . , arrayed in a line; a transfer thyristor array 103 formed of transfer thyristors T1, T2, T3, . . . , arrayed in a line; and a light-emission control thyristor array 104 formed of light-emission control thyristors C1, C2, C3, . . . , arrayed in a line. In addition, the light-emitting element chip 51 further includes a light-emission enable thyristor Td, a start diode Ds, connecting diodes Dt1, Dt2, Dt3, connecting diodes Dc1, Dc2, Dc3, . . . , and multiple load resistors R.

The transfer thyristors T1, T2, T3, . . . , are sequentially turned on to specify the light-emitting thyristors L1, L2, L3, . . . , as targets for controlling whether or not to emit light, respectively. Meanwhile, when turned on, each of the light-emission control thyristors C1, C2, C3, . . . , set one of the light-emitting thyristors L1, L2, L3, . . . , which is assigned the same number as that of the light-emission control thyristor, ready to emit light. The light-emission enable thyristor Td controls whether or not to receive the instructions to cause or not to cause the light-emitting thyristors L1, L2, L3, . . . , to emit light.

The light-emitting thyristors L1, L2, L3, . . . , the transfer thyristors T1, T2, T3, . . . , the light-emission control thyristors C1, C2, C3, . . . , and the light-emission enable thyristor Td, which have a pnpn structure formed of a GaAs-based semiconductor, each are a three-terminal thyristor having an anode electrode, a cathode electrode and a gate electrode.

Hereinbelow, the i-th light-emitting thyristor from the left of FIG. 5 (from the side closer to the terminals 101a to 101e) will be expressed as light-emitting thyristor Li (i is an integer of 1 or more). Additionally, the transfer thyristors, the light-emission control thyristors and the connecting diodes will be represented in a similar manner.

As shown in FIG. 5, in the light-emitting element chip 51, the transfer thyristors Ti and the light-emission control thyristors Ci are alternately arrayed in a line. Meanwhile, the light-emitting thyristors Li are arrayed in a line and connected to the respective light-emission control thyristors Ci. Here, the number of light-emitting thyristors Li, the number of transfer thyristors Ti and the number of light-emission control thyristors Ci are the same as one another in the light-emitting element chip 51.

Next, a description will be given of the connection relation and the positional relation of the elements with reference to FIG. 5.

The gate electrode G1 of each transfer thyristor Ti is connected to the gate electrode Gci of the light-emission control thyristor Ci adjacent to the transfer thyristor Ti via the corresponding connecting diode Dti. Here, each connecting diode Dti is connected with its orientation set to allow a current to flow from the gate electrode G1 to the gate electrode Gci.

The gate electrode Gci of each light-emission control thyristor Ci is connected to the gate electrode G1+1 of the transfer thyristor Ti+1 adjacent to the light-emission control thyristor Ci via the corresponding connecting diode Dci. Here, each connecting diode Dci is connected with its orientation set to allow a current to flow from the gate electrode Gci to the gate electrode G1+1. In this way, in the light-emitting element chip 51, the connecting diodes Dti and the connecting diodes Dci are alternately arrayed so as to allow a current to flow in one direction therethrough. In addition, the gate electrode Gci of each light-emission control thyristor Ci is connected to the gate electrode Gsi of the corresponding light-emitting thyristor Li via a resistor Rp.

The gate electrode G1 of each transfer thyristor Ti and the gate electrode Gci of each light-emission control thyristor Ci are connected to a power supply line 71 via the respective load resistors R provided corresponding to these thyristors. The power supply line 71 is connected to the power supply terminal 101d.

The cathode electrode of each transfer thyristor Ti is connected to a first clock signal line 72. The first clock signal line 72 is connected to the first clock signal terminal 101b via a resistor.

The cathode electrode of each light-emission control thyristor Ci is connected to a second clock signal line 73. The second clock signal line 73 is connected to the second clock signal terminal 101c via a resistor.

The cathode electrode of each light-emitting thyristor Li is connected to a lighting signal line 74. The lighting signal line 74 is connected to the lighting signal terminal 101a via a load resistor.

The cathode electrode of the light-emission enable thyristor Td is connected to the second clock signal line 73. Meanwhile, the gate electrode Gt of the light-emission enable thyristor Td is connected to a light-emission enable signal line 75, and is further connected to the light-emission enable signal terminal 101e via a load resistor.

The anode electrode of each of the transfer thyristors Ti, the light-emission control thyristors Ci, the light-emitting thyristors Li and the light-emission enable thyristor Td is connected to a backside common electrode 81 of the substrate 105.

The cathode electrode and the anode electrode of the start diode Ds are connected to the gate electrode G1 of the transfer thyristor T1 and the second clock signal line 73, respectively.

Thus, in terms of connection relations respectively of the anode electrode and the cathode electrode, it may be said that the light-emission enable thyristor Td is connected in parallel to the light-emission control thyristors Ci. In this regard, the cathode electrode of the light-emission enable thyristor Td is connected to the second clock signal line 73 at a position closer to the second clock signal terminal 101c than any of the light-emission control thyristors Ci is.

The lighting signal terminal 101a, the first clock signal terminal 101b, the second clock signal terminal 101c and the light-emission enable signal terminal 101e are supplied with one of the lighting signals ϕI, the first clock signal ϕ1, one of the second clock signals ϕ2 and one of the light-emission enable signals En, respectively.

Meanwhile, the power supply terminal 101d and the backside common electrode 81 are supplied with the power supply voltage Vga (assumed here to be −3.3 V), and the reference voltage Vsub (assumed here to be 0 V), respectively.

The light-emitting element head 90 drives the multiple light-emitting element chips 51 in groups as shown in FIGS. 3B and 4 so as to cause the groups different from each other to operate in parallel. Thus, an operation of one group will be firstly described.

Figure 6:
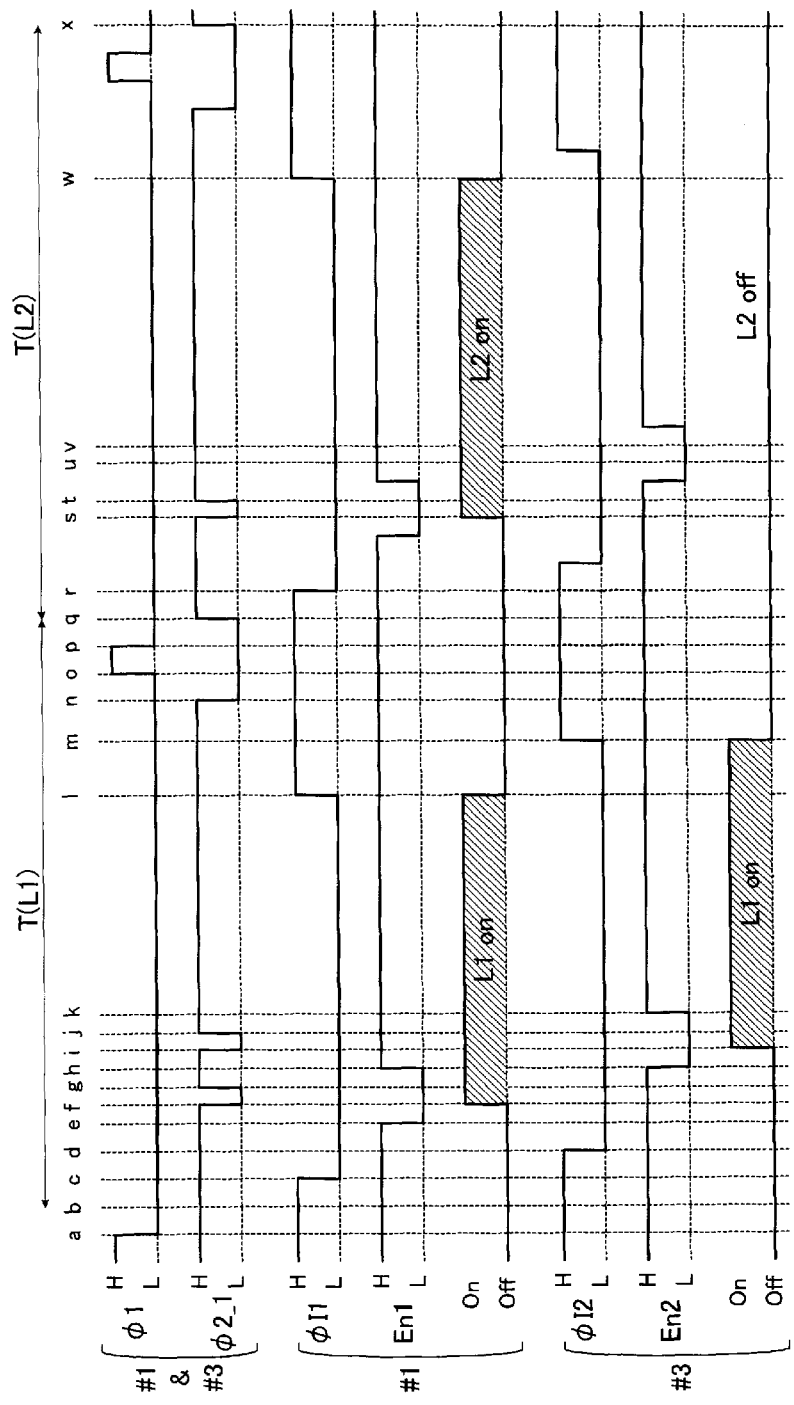
FIG. 6 is a time chart for explaining the operation of one group in each light-emitting element head, by taking, as an example, the group formed of 2 light-emitting element chips.

FIG. 6 is a time chart for explaining the operation of one group in each light-emitting element head 90, by taking, as an example, the A group formed of #1 and #3 of the light-emitting element chips 51. Specifically, FIG. 6 illustrates light-emission control of the two light-emitting thyristors L1 and L2 among all the light-emitting thyristors L1, L2, . . . , provided in each of #1 and #3 of the light-emitting element chips 51.

Hereinbelow, periods during which the light-emitting operations of the light-emitting thyristors L1, L2, . . . in each of #1 and #3 of the light-emitting element chips 51 are controlled will be referred to as periods T (L1), T (L2), respectively.

Accordingly, in FIG. 6, a period from a time point b to a time point q and a period from the time point q to a time point x are the periods T(L1) and T(L2), respectively.

Firstly, the signals supplied to #1 and #3 of the light-emitting element chips 51, which belong to the A group, will be described with reference to FIG. 6.

The first clock signal ϕ1, which is supplied in common to all the light-emitting element chips 51 in the light-emitting element head 90, is supplied in common to #1 and #3 of the light-emitting element chips 51 in the A group. Among the second clock signals p2, the 2_1-th clock signal ϕ2_1, which is supplied only to the A group, is supplied in common to #1 and #3 of the light-emitting element chips 51 in the A group.

In addition, the first lighting signal ϕI1 and the first light-emission enable signal En1 are supplied to #1 of the light-emitting element chips 51. Meanwhile, the second lighting signal ϕI2 and the second light-emission enable signal En2 are supplied to #3 of the light-emitting element chips 51.

As described above, the light-emitting element chips 51 belonging to the same group are supplied with the respective different lighting signals ϕI, while supplied with the respective different light-emission enable signals En.

In the period T(L1), the first clock signal ϕ1 is at the low level (L level) during a period from the time point b to a time point o, at the high level (H level) during a period from the time point o to a time point p, and at the L level during a period from the time point p to the time point q.

A description for the second clock signal p2 will be given later.

In the period T(L1), the first lighting signal ϕI1 is at the L level as an example of a second potential difference, during a period from a time point c to a time point l, and at the H level as an example of a first potential difference, during the other periods. Meanwhile, in the period T(L1), the second lighting signal φI2 is at the L level during a period from a time point d to a time point m, and at the H level during the other periods. The first lighting signal φI1 and the second lighting signal φI2 are set to the L level for the same-length period as each other, but transition from the H level to the L level at different timings from each other.

Note that, the first and second lighting signals φI1 and φI2 transition from the H level to the L level after the first clock signal φ1 transitions from the H level to the L level, and the first and second lighting signals φI1 and φI2 transition from the L level to the H level before the first clock signal φ1 transitions from the L level to the H level.

Similarly, in the period T(L1), the first light-emission enable signal En1 is at the L level during a period from a time point e to a time point h, and at the H level during the other periods. Meanwhile, in the period T(L1), the second light-emission enable signal En2 is at the L level during a period from the time point h to a time point k, and at the H level during the other periods. The period during which the first light-emission enable signal En1 is at the L level and the period during which the second light-emission enable signal En2 is at the L level are provided to both lie within the period during which the first clock signal φ1 is at the L level while being displaced from each other in terms of time. In other words, the first light-emission enable signal En1 and the second light-emission enable signal En2, which are supplied respectively to #1 and #3 of the light-emitting element chips 51, has different supply timings (timings of supplying the periods of being at the L level) from each other.

Each of the first clock signal φ1, the first and second light-emission enable signals En1 and En2, and the first and second lighting signals φI1 and φI2 repeats the cycle of the period T(Li).

Now, the 2_1-th clock signal φ2_1 will be described.

The 2_1-th clock signal φ2_1 has periods of being at the L level each lying within the period during which any of the light-emission enable signals En (the first light-emission enable signal En1 or the second light-emission enable signal En2) is at the L level.

For example, in the period T(L1), the 2_1-th clock signal φ2_1 has a period (from a time point f to a time point g) of being at the L level in the period (from the time point e to the time point h) during which the first light-emission enable signal En1 is at the L level, in the case of causing the light-emitting thyristor L1 in #1 of the light-emitting element chips 51 to emit light. In addition, the 2_1-th clock signal φ2_1 has a period (from a time point i to a time point j) of being at the L level in the period (from the time point h to the time point k) during which the second light-emission enable signal En2 is at the L level, in the case of causing the light-emitting thyristor L1 in #3 of the light-emitting element chips 51 to emit light.

Additionally, in the period T(L2), the 2_1-th clock signal φ2_1 has a period (from a time point s to a time point t) of being at the L level in the period during which the first light-emission enable signal En1 is at the L level, in the case of causing the light-emitting thyristor L2 in #1 of the light-emitting element chips 51 to emit light. By contrast, the 2_1-th clock signal φ2_1 remains set to the H level instead of having a period (from a time point u to a time point v) of being at the L level even in the period during which the second light-emission enable signal En2 is at the L level, in the case of causing the light-emitting thyristor L2 in #3 of the light-emitting element chips 51 not to emit light.

In other words, the 2_1-th clock signal φ2_1 have at least one period of being at the L level in the case where the corresponding light-emitting thyristor Li of any of #1 and #3 of the light-emitting element chips 51 is caused to emit light.

Note that, the 2_1-th clock signal φ2_1 is set to the L level in a period from a time point n to the time point q regardless of causing any of the light-emitting thyristors L1 to emit light, as will be described later. In the rest of the periods, the 2_1-th clock signal φ2_1 is at the H level.

Hereinabove, a description has been given of the A group (#1 and #3 of the light-emitting element chips 51) in the light-emitting element head 90.

Note that, only by replacing the 2_1-th clock signal φ2_1 with the 2_2-th clock signal φ2_2, the time chart in FIG. 6 may be applied to the B group (#2 and #4) shown in FIGS. 3B and 4. Specifically, the first light-emission enable signal En1 and the first lighting signal φI1, which are supplied to #1 in the A group, are also supplied to #2 in the B group. Meanwhile, the second light-emission enable signal En2 and the second lighting signal φI2, which are supplied to #3 in the A group, are also supplied to #4 in the B group.

Similarly, only by replacing the 2_1-th clock signal φ2_1 with the 2_3-th clock signal φ2_3, the time chart in FIG. 6 may be applied to the C group (#5 and #7). Specifically, the first light-emission enable signal En1 and the first lighting signal φI1, which are supplied in common to #1 and #2 in the respective A and B groups, are also supplied to #5 in the C group. Meanwhile, the second light-emission enable signal En2 and the second lighting signal φI2, which are supplied in common to #3 and #4 in the respective A and B groups, are also supplied to #7 in the C group.

Additionally, only by replacing the 2_1-th clock signal φ2_1 with the 2_4-th clock signal φ2_4, the time chart in FIG. 6 may be applied to the D group (#6 and #8). Specifically, the first light-emission enable signal En1 and the first lighting signal φI1, which are supplied in common to #1, #2 and #5 in the respective A to C groups, are also supplied to #6 in the D group. Meanwhile, the second light-emission enable signal En2 and the second lighting signal φI2, which are supplied in common to #3, #4 and #7 in the respective A to C groups, are also supplied to #8 in the D group.

As described above, the groups (A to D) in the light-emitting element head 90 operate in parallel.

Moreover, the multiple light-emitting element chips 51 belonging to the same group also operate in parallel as will be described later. Thus, all the light-emitting element chips 51 in the light-emitting element head 90 operate in parallel.

Next, the operation of #1 of the light-emitting element chips 51, which belongs to the A group, will be described.

As has been described above, #1 of the light-emitting element chips 51 is supplied with the first clock signal φ1, the 2_1-th clock signal φ2_1, the first light-emission enable signal En1 and the first lighting signal φI1. As described above, the first clock signal φ1 is supplied in common to all the light-emitting element chips 51. The 2_1-th clock signal φ2_1 is supplied in common to the light-emitting element chips 51 in the A group (#1 and #3). The first light-emission enable signal En1 and the first lighting signal φI1 are supplied only to #1 among the light-emitting element chips 51 in the A group.

In the first exemplary embodiment, the light-emission enable thyristor Td and the light-emission control thyristors Ci play important roles. Accordingly, overall operations of the light-emission enable thyristor Td and the light-emission control thyristors Ci in each light-emitting element chip 51 will firstly be described with reference to FIG. 5.

As has been described above, the light-emission enable thyristor Td and the light-emission control thyristors Ci are connected in parallel. Specifically, the cathode electrode of the light-emission enable thyristor Td and the cathode electrodes of the light-emission control thyristors Ci are connected to the second clock signal line 73. Accordingly, what is important here is which one of the light-emission enable thyristor Td and the light-emission control thyristors Ci, gets turns on when the 2_1-th clock signal φ2_1 is supplied. Here, the light-emission enable thyristor Td and the light-emission control thyristors Ci are connected in parallel, and the 2_1-th clock signal φ2_1 is capable of turning on just one of the light-emission enable thyristor Td and the light-emission control thyristors Ci at a time.

In general, the potential difference between the anode electrode and the cathode electrode of a thyristor for turning on the thyristor (the potential difference will be hereinafter referred to as ON voltage Von) is expressed by Von<Vg−Vd, where Vg denotes the potential of the gate electrode of the thyristor, and Vd denotes a forward threshold voltage of the pn junction. Here, the forward threshold voltage Vd of the pn junction may be considered to be 1.4 V on the basis of the properties of the light-emitting element chip 51.

As has been described above, the light-emission enable thyristor Td is connected to the second clock signal line 73 at a position closer to the second clock signal terminal 101c than any of the light-emission control thyristors Ci is. Accordingly, the 2_1-th clock signal φ2_1 reaches the light-emission enable thyristor Td before reaching to any of the light-emission control thyristors Ci. In addition, the ON voltage Von of the light-emission enable thyristor Td, which serves as a threshold value for turning it on, is smaller in absolute value than that of any of the light-emission control thyristors Ci, as will be described later. For these reasons, the light-emission enable thyristor Td may be turned on in response to even a small potential difference in the 2_1-th clock signal φ2_1.

Thus, even the conditions for turning on both the light-emission enable thyristor Td and any of the light-emission control thyristors Ci are satisfied, only the light-emission enable thyristor Td preferentially gets turned on. In this case, the potential of the cathode electrode of the light-emission enable thyristor Td drops to the forward threshold voltage Vd (−1.4 V) of the pn junction. Accordingly, the second clock signal line 73, to which the cathode electrode of the light-emission enable thyristor Td is connected, is fixed at −1.4 V. As a result, the light-emission control thyristors Ci are not allowed to be turned on, and thus remain turned off since the ON voltage Von thereof is larger in absolute value than −1.4 V.

In other words, when turned on, the light-emission enable thyristor Td fixes the second clock signal line 73 at −1.4 V, and thus functions to prevent, as long as being turned on, the light-emission control thyristors Ci from being turned on. On the other hand, when not turned on, the light-emission enable thyristor Td does not fix the second clock signal line 73 at any voltage, so that its function preventing the light-emission control thyristors Ci from being turned on is disabled.

Hereinafter, with reference to FIG. 5, the operation of #1 of the light-emitting element chips 51 will be described in order of time based on the time points shown in FIG. 6. Assume here that time flows from the time point a to the time point x in alphabetical order.

In the initial state (just before a time point a), the transfer thyristors Ti, the light-emission control thyristors Ci, the light-emitting thyristors Li and the light-emission enable thyristor Td are all turned off. In this state, the first clock signal p1 and the 2_1-th clock signal φ2_1 are set to the H level. In addition, the first lighting signal φI1 and the first light-emission enable signal En1 are also set to the H level.

In that initial state, the anode electrode of the start diode Ds is set to the H level since the second clock signal φ2 is at the H level, while the potential of the cathode electrode of the start diode Ds, which is connected to the power supply line 71 via the corresponding load resistor R, is the power supply voltage Vga=−3.3 V. Thus, the start diode Ds is forward biased, so that the potential of the gate electrode G1 of the transfer thyristor T1 takes a value obtained by subtracting, from the H level (0 V), the forward threshold voltage Vd (diffusion potential) of the pn junction of the start diode Ds. Accordingly, in the initial state, the potential of the gate electrode G1 of the transfer thyristor T1 is −1.4 V, and thus the ON voltage Von of the transfer thyristor T1 is −2Vd=−2.8 V.

Meanwhile, in the initial state, the potential of the gate electrode Gc1 of the light-emission control thyristor C1, which is adjacent to the transfer thyristor T1, depends on the forward threshold voltage Vd of the pn junctions respectively in the start diode Ds and the connecting diode Dt1, and thus is −2Vd=−2.8 V. In the initial state, the ON voltage Von of the light-emission control thyristor C1 is −4.2 V. The potential of the gate electrodes G2, G3, . . . , and Gc2, Gc3, . . . , respectively of the transfer thyristors T2, T3, . . . , and the light-emission control thyristors C2, C3, . . . , is the power supply voltage Vga=−3.3 V, and thus the ON voltage Von of these thyristors is −4.7 V in the initial state.

In the initial state, the potential of the gate electrode Gsi of each light-emitting thyristor Li is the power supply voltage Vga=−3.3 V, and thus the ON voltage Von of all the light-emitting thyristors Li is −4.7 V.

On the other hand, in the initial state, the potential of the gate electrode Gt of the light-emission enable thyristor Td is 0 V since the first light-emission enable signal En1 is set to the H level. Accordingly, in the initial state, the ON voltage Von of the light-emission enable thyristor Td is −1.4 V.

At the time point a shown in FIG. 6, the voltage of the first clock signal φ1 drops to a voltage lower than the ON voltage Von (−2.8 V) of the transfer thyristor T1 but higher than the ON voltage Von (−4.7 V) of the other transfer thyristors T2, T3, . . . , such as the power supply voltage Vga=−3.3 V (L level). In response, among the transfer thyristors, only the transfer thyristor T1 gets turned on, and thereby the transfer operation of the transfer thyristor array 103 starts.

Note that it is only in the initial state where the light-emitting element chip 51 starts operating that the both the first clock signal φ1 and the 2_1-th clock signal φ2_1 are at the H level, and thus the start diode Ds operates only in the initial state.

When the transfer thyristor T1 gets turned on, the potential of the gate electrode G1 rises from −1.4 V to approximately the H level of 0 V. The effect of this potential rise is transmitted to the gate electrode Gc1 through the connecting diode Dt1 that gets forward biased. In response, the potential of the gate electrode Gc1 rises from −2.8 V to −1.4 V, and thus the ON voltage Von of the light-emission control thyristor C1 rises from −4.2 V to −2.8 V.

This further causes the potential of the gate electrode G2 of the transfer thyristor T2 to rise from −3.3 V to −2.8 V, and thus the ON voltage Von of the transfer thyristor T2 rises from −4.7 V to −4.2 V. Meanwhile, the potential of the gate electrodes Gc2, Gc3, . . . , and G3, G4, . . . , respectively of the light-emission control thyristors C2, C3, . . . , and the transfer thyristors T3, T4, . . . , remains set to the power supply voltage Vga=−3.3 V, and thus the ON voltage Von of these thyristors remains −4.7 V.

At this time, the potential of the gate electrode Gs1 of the light-emitting thyristor L1 becomes a voltage based on both the forward threshold voltage Vd of the pn junction in the connecting diode Dt1 and a voltage drop (δ) caused by the corresponding resistor Rp, that is, becomes −Vd+δ. Accordingly, the potential of the gate electrode Gs1 of the light-emitting thyristor L1 rises from −3.3 V to −2.2 V, and thus the ON voltage Von of the light-emitting thyristor L1 rises from −4.7 V to −3.6 V, since δ may be considered to be −0.8 V based on the properties of the light-emitting element chip 51. Meanwhile, as to the light-emitting thyristors other than the light-emitting thyristor L1, the potential of the gate electrodes Gs2, Gs3, . . . , of the light-emitting thyristors L2, L3, . . . , remains set to the power supply voltage Vga=−3.3 V, and thus the ON voltage Von of these light-emitting thyristors remains −4.7 V.

At the time point c, that is, after the transfer thyristor T1 gets turned on at the time point a, the first lighting signal φI1 transitions from the H level to the L level (−3.3 V). In response, in each light-emitting thyristor Li forming the light-emitting thyristor array 102, the potential of the cathode electrode becomes lower than that of the anode electrode, namely, becomes −3.3 V. However, none of the light-emitting thyristors Li is turned on to emit light since the ON voltage Von of the light-emitting thyristor L1 is −3.6 V and the ON voltage Von of the light-emitting thyristors L2, L3, . . . , is −4.7 V.

Then, at the time point e, the first light-emission enable signal En1 is set to the L level of −3.3 V. In response, the ON voltage Von of the light-emission enable thyristor Td drops from −1.4 V to −4.7 V.

Then, at the time point f, the 2_1-th clock signal φ2_1 transitions to the L level. At this time, the light-emission enable thyristor Td is not allowed to be turned on since its ON voltage Von is −4.7 V. Thus, the potential of the second clock signal line 73 changes in accordance with the 2_1-th clock signal φ2_1, thus becoming the L level (−3.3 V), which is lower than the ON voltage Von (−2.8 V) of the light-emission control thyristor C1 but higher than the ON voltage Von (−4.7 V) of the other light-emission control thyristors C2, C3, . . . . As a result, the light-emission control thyristor C1 gets turned on at the time point f.

When the light-emission control thyristor C1 is turned on, the potential of the gate electrode Gc1 rises to approximately the H level (0 V). In response, the ON voltage Von of the light-emitting thyristor L1 rises from −3.6 V to −2.2 V. Meanwhile, the potential of the gate electrodes Gs2, Gs3, . . . , remains set to the power supply voltage Vga=−3.3 V, and thus the ON voltage Von of the light-emitting thyristors L2, L3, . . . , remains −4.7 V.

In addition, at the time point f, the first lighting signal φI1 remains set to the L level (−3.3 V). Thus, among the light-emitting thyristors Li of the light-emitting thyristor array 102, only the light-emitting thyristor L1 gets turned on, and thus starts emitting light since the potential difference between the anode electrode and the cathode electrode of the light-emitting thyristor L1 alone becomes lower than the ON voltage Von thereof.

Additionally, when the potential of the gate electrode Gc1 rises to approximately the H level of 0 V, the effect of this potential rise is transmitted to the gate electrode G2 through the connecting diode Dc1 that gets forward biased. In response, the potential of the gate electrode G2 rises from −2.8 V to −1.4 V, and thus the ON voltage Von of the transfer thyristor T2 rises from −4.2 V to −2.8 V.

Then, at the time point g, the 2_1-th clock signal φ2_1 transitions to the H level. This causes the cathode electrode and the anode electrode of the light-emission control thyristor C1 to have approximately the same potential as each other, so that the light-emission control thyristor C1 gets turned off. Accordingly, the potential of the gate electrode Gc1 drops back from 0 V to −1.4 V, which further causes the ON voltage Von of the transfer thyristor T2 to drop back from −2.8 V to −4.2 V.

However, the first lighting signal φI1 set to the L level (−3.3 V) keeps the light-emitting thyristor L1 turned on. In other words, even if the light-emission control thyristor C1 gets turned off at the time point g, the light-emitting thyristor L1 is kept turned on, and thus continues to emit light.

Then, at the time point h, the first light-emission enable signal En1 transitions to the H level. In response, the potential of the gate electrode Gt of the light-emission enable thyristor Td rises from −3.3 V to 0 V, and thus the ON voltage Von of the light-emission enable thyristor Td rises from −4.7 V to −1.4 V.

Subsequently, at the time point i, the 2_1-th clock signal φ2_1 transitions to the L level (−3.3 V). This turns on not the light-emission control thyristor C1 whose ON voltage Von is −2.8 V but the light-emission enable thyristor Td whose ON voltage Von is −1.4 V, as described above. Accordingly, the potential of the second clock signal line 73 is immediately caused to be fixed at −1.4 V. The light-emission control thyristor C1 is not allowed to be turned on under that condition, and thus remains turned off.

However, at the time point i, the light-emitting thyristor L1 still continues to emit light since the first lighting signal φI1 set to the L level (−3.3 V) keeps the light-emitting thyristor L1 turned on.

Then, at the time point j, the 2_1-th clock signal φ2_1 transitions to the H level. In response, the potential of the cathode electrode of the light-emission enable thyristor Td becomes the H level, which is the same as the potential of its anode electrode. Accordingly, the light-emission enable thyristor Td is no longer kept turned on, and thus gets turned off. However, the light-emission control thyristor C1 is also kept turned off since the 2_1-th clock signal φ2_1 is at the H level (0 V).

Even at the time point j, the light-emitting thyristor L1 still continues to emit light since the first lighting signal φI1 set to the L level keeps the light-emitting thyristor L1 turned on, as described above.

Then, at the time point l, the first lighting signal φI1 transitions from the L level to the H level. This causes the cathode electrode and the anode electrode of the light-emitting thyristor L1 to have approximately the same potential as each other. As a result, the light-emitting thyristor L1 is no longer kept turned on, and gets turned off. Thus, the light-emitting thyristor L1 stops emitting light.

Here, in order to control whether or not the light-emitting thyristors L1, L2, L3, . . . , emit light in numerical order in each light-emitting element chip 51, the following periods need to be repeated: a period during which the transfer thyristor Ti alone is turned on; a period during which the transfer thyristor Ti and the light-emission control thyristor Ci adjacent thereto are both turned on; a period during which the light-emission control thyristor Ci alone is turned on; a period during which the light-emission control thyristor Ci and the transfer thyristor Ti+1 adjacent thereto are both turned on; and a period during which the transfer thyristor Ti+1 alone is turned on.

However, at the time point m, the transfer thyristor T1 is turned on, but the light-emission control thyristor C1 remains turned off after the time point g. Thus, at the time point n, immediately after the time point m, the 2_1-th clock signal φ2_1 is set to the L level, and thus the light-emission control thyristor C1 gets turned on again. As a result, the transfer thyristor T1 and the light-emission control thyristor C1 are both turned on. In response, the potential of the gate electrode G2 rises from −2.8 V to −1.4 V, and thus the ON voltage Von of the transfer thyristor T2 rises from −4.2 V to −2.8 V.

Thereafter, at the time point o, the first clock signal φ1 transitions to the H level, and thus the transfer thyristor T1 gets turned off. Meanwhile, the light-emission control thyristor C1 is kept turned on.

Then, at the time point p, the first clock signal φ1 transitions to the L level, and thus the transfer thyristor T2 gets turned on. As a result, the light-emission control thyristor C1 and the transfer thyristor T2 are both turned on.

After that, at the time point q, the 2_1-th clock signal φ2_1 transitions to the H level, and thus the light-emission control thyristor C1 gets turned off. Meanwhile the transfer thyristor T2 is kept turned on.

Note that, during the period from the time point n to the time point q, the first lighting signal φI1 is at the H level, so that none of the light-emitting thyristors Li emits light.

As has been described above, the period from the time point n to the time point q serves as a transition period from the period during which the transfer thyristor T1 is turned on to the period during which the transfer thyristor T2 is turned on.

In other words, at the time point q, the period T(L1) for controlling the light-emitting operation of the light-emitting thyristor L1 ends and the period T(L2) for controlling the light-emitting operation of the light-emitting thyristor L2 starts instead.

Note that, each second clock signal φ2 works with the first clock signal φ1 to perform a role of sequentially specifying the light-emitting thyristors L1, L2, L3, . . . , as targets for controlling whether or not to emit light. Thus, the second clock signal φ2 is an example of the first control signal, as well as an example of the second control signal.

The period T(L2) will be described not in detail but briefly since operations in the period T(L2) may be achieved simply by repeating those in the period T(LI) except for those regarding the 2_1-th clock signal φ2_1. At the time point when the 2_1-th clock signal φ2_1 transitions to the L level, the light-emitting thyristor L2 gets turned on, and thus starts emitting light, like the light-emitting thyristor L1 at the time point f.

Then, at a time point w when the first lighting signal φI1 transitions from the L level to the H level, the light-emitting thyristor L2 gets turned off, and thus stops emitting light.

Note that, in the period T(L2), even if the transfer thyristor T2 is turned on, so that the potential of the gate electrode G2 rises to approximately the H level of 0 V, the effect of this electronic potential rise is not transmitted to the gate electrode G1 since the connecting diodes Dc1 and Dt1 are both reverse biased in this period. Accordingly, during the period T(L2), the potential of the gate electrode G1 is the power supply voltage Vga=−3.3 V, and thus the ON voltage Von of the transfer thyristor T1 is −4.7 V. For this reason, though the first clock signal φ1 transitions to the L level (−3.3 V) at the time point p, the transfer thyristor T1 does not get turned on any more.

In other words, in each period T(Li), it is only the corresponding one of the transfer thyristors Ti that is allowed to be turned on in the transfer thyristor array 103.

Similarly, during the period T(L2), since the connecting diode Dc1 is kept reverse biased, the potential of the gate electrode Gc1 of the light-emission control thyristor C1 is the power supply voltage Vga=−3.3 V, and thus the ON voltage Von of the light-emission control thyristor C1 is −4.7 V. For this reason, in the period T(L2), the light-emission control thyristor C1 is not allowed to be turned on even if the 2_1-th clock signal φ2_1 transitions to the L level (−3.3 V).

In other words, in the period T(Li), it is only the corresponding one of the light-emission control thyristors Ci that is allowed to be turned on in the light-emission control thyristor array 104.

Meanwhile, during the period T(L2), since the connecting diode Dc1 is kept reverse biased, the potential of the gate electrode Gs1 of the light-emitting thyristor L1 is also the power supply voltage Vga=−3.3 V, and thus the ON voltage Von thereof is −4.7 V. For this reason, in the period T(L2), the light-emitting thyristor L1 is not allowed to be turned on and thus emits no light even if the first lighting signal φI1 transitions to the L level.

In other words, in the period T(Li), it is only the corresponding one of the light-emitting thyristors Li that is allowed to be turned on in the light-emitting thyristor array 102.

As has been described above, control is performed such that, while the first clock signal φ1 set to the L level keeps one of the transfer thyristors Ti turned on, the second clock signal φ2 repeats transitions between the H level and the L level, and thus causes the corresponding light-emission control thyristor Ci to repeat transitions between on and off.

Any of the transfer thyristors Ti is kept turned on at a timing when the light-emission control thyristor Ci transitions between an on state and an off state. This ensures that the position of the light-emitting thyristor Li set as a light-emission control target is not lost. In other words, the transfer thyristors Ti function to hold position information of the light-emitting thyristors Li.

Meanwhile, when the light-emission control thyristor Ci gets turned on, the ON voltage Von of the corresponding light-emitting thyristor Li rises. At this time, if the first lighting signal φI1 is the L level, the potential difference between the anode electrode and the cathode electrode of the light-emitting thyristor Li is lower than its ON voltage Von, so that the light-emitting thyristor Li starts emitting light. On the other hand, if the first lighting signal φI1 is the H level at this time, the potential difference between the anode electrode and the cathode electrode of the light-emitting thyristor Li is not lower than its ON voltage Von, so that the light-emitting thyristor Li continues to emit no light.

In other words, by being turned on after the transfer thyristor Ti gets turned on, the light-emission control thyristor Ci functions to set the corresponding light-emitting thyristor Li ready to emit light.

The subsequent process in the period T(L3) or later may be achieved simply by repeating the operations performed at and after the time point b.

Next, the operation of #3 of the light-emitting element chips 51, which belongs to the A group, will be described. #3 of the light-emitting element chips 51 operates parallel to #1 of the light-emitting element chips 51.

In FIG. 6, #3 of the light-emitting element chips 51 is supplied with the first clock signal φ1, the 2_1-th clock signal φ2_1, the second light-emission enable signal En2 and the second lighting signal φI2. As described above, the first clock signal φ1 is supplied in common to all the light-emitting element chips 51. The 2_1-th clock signal φ2_1 is supplied in common to #1 and #3 in the A group. The second light-emission enable signal En2 and the second lighting signal φI2 are supplied only to #3 among the light-emitting element chips 51 in the A group.

Hereinafter, with reference to FIG. 5, the operation of #3 of the light-emitting element chips 51 will be described in order of time based on the time points shown in FIG. 6. A description similar to that for #1 of the light-emitting element chips 51 will be omitted.

The initial state (just before the time point a) of #3 of the light-emitting element chips 51 is the same as that of #1. Thus, in the initial state, the ON voltage Von of the light-emission enable thyristor Td is −1.4 V.

At the time point a, only the transfer thyristor T1 gets turned on, and thereby the transfer operation of the transfer thyristor array 103 starts, as in #1.

At the time point d, that is, after the transfer thyristor T1 gets turned on at the time point a, the second lighting signal $\phi I2$ transitions from the H level to the L level (−3.3 V). In response, in each light-emitting thyristor Li forming the light-emitting thyristor array 102, the potential of the cathode electrode becomes lower than that of the anode electrode, namely, becomes −3.3 V. However, as in #1, none of the light-emitting thyristors Li in #3 is turned on to emit light since the ON voltage Von of the light-emitting thyristor L1 is −3.6 V, and the ON voltage Von of the light-emitting thyristors L2, L3, . . . , is −4.7 V.

Then, at the time point f, the 2_1-th clock signal $\phi 2\_1$ transitions to the L level (−3.3 V). In response, the light-emission enable thyristor Td, which is connected in parallel to the light-emission control thyristors Ci, gets turned on since its ON voltage Von is −1.4 V. Thereby, the potential of the cathode electrode of the light-emission enable thyristor Td drops from 0 V to −1.4 V, which causes the potential of the second clock signal line 73, to which the cathode electrode of the light-emission enable thyristor Td is connected, to immediately rise from −3.3 V to −1.4 V and be fixed at −1.4 V.

Accordingly, the light-emission control thyristor C1 remains turned off, and no change occurs in the ON voltage Von of any of the light-emitting thyristors Li, which thus emits no light.

At the time point g, the 2_1-th clock signal $\phi 2\_1$ transitions to the H level. This causes the cathode electrode and the anode electrode of the light-emission enable thyristor Td to have approximately the same potential as each other. As a result, the light-emission enable thyristor Td is no longer kept turned on, and thus gets turned off. Note that, at the time point g, the light-emission control thyristor C1 is kept turned off since the 2_1-th clock signal $\phi 2\_1$ is at the H level.

Then, at the time point h, the second light-emission enable signal En2 is set to the L level of −3.3V. In response, the ON voltage Von of the light-emission enable thyristor Td drops from −1.4 V to −4.7 V.

Then, at the time point i, the 2_1-th clock signal $\phi 2\_1$ transitions to the L level. At this time, the light-emission enable thyristor Td is not allowed to be turned on since its ON voltage Von is −4.7 V. Thus, the potential of the second clock signal line 73 changes in accordance with the 2_1-th clock signal $\phi 2\_1$, thus becoming the L level (−3.3 V). As a result, the light-emission control thyristor C1 gets turned on at the time point i.

When the light-emission control thyristor C1 is turned on, the ON voltage Von of the light-emitting thyristor L1 rises from −3.6 V to −2.2 V. Meanwhile, the ON voltage Von of the light-emitting thyristors L2, L3, . . . , remains −4.7 V. In addition, at the time point i, the second lighting signal $\phi I2$ remains set to the L level (−3.3 V). Thus, among the light-emitting thyristors Li of the light-emitting thyristor array 102, only the light-emitting thyristor L1 gets turned on, and thus starts emitting light.

Then, at the time point m, the second lighting signal $\phi I2$ transitions from the L level to the H level. This causes the cathode electrode and the anode electrode of the light-emitting thyristor L1 to have approximately the same potential as each other. As a result, the light-emitting thyristor L1 is no longer kept turned on, and thus gets turned off to stop emitting light.

Note that, in the period T(L2), at the time point u, which lies in the period during which the second light-emission enable signal En2 is at the L level, the 2_1-th clock signal $\phi 2\_1$ is not set to the L level. Accordingly, the light-emitting thyristor L2 of #3 of the light-emitting element chips 51 is not turned on, and thus emits no light.

The subsequent process in the period T(L3) or later may be achieved simply by repeating the operations performed at and after the time point b.

Here, #1 and #3 of the light-emitting element chips 51 will be collectively considered. In the period T(L1), the light-emitting thyristors L1 respectively of #1 and #3 of the light-emitting element chips 51 are caused to emit light in parallel. By contrast, in the period T(L2), the light-emitting thyristor L2 of #1 of the light-emitting element chips 51 is caused to emit light while the light-emitting thyristor L2 of #3 of the light-emitting element chips 51 is caused to emit no light.

The operations described above will be summarized as follows.

In the light-emitting element chip 51, one of the light-emitting thyristors Li gets turned on to start emitting light by performing the following operations: firstly setting the first clock signal $\phi 1$ to the L level to turn on the corresponding transfer thyristor Ti, and then setting the corresponding lighting signal $\phi I$ to the L level; and secondly, setting the corresponding second clock signal $\phi 2$ to the L level to turn on the light-emission control thyristor Ci in the period during which the corresponding light-emission enable signal En is at the L level.

On the other hand, the light-emitting thyristor Li may be caused to continue to emit no light by keeping the second clock signal $\phi 2$ at the H level in the period during which the light-emission enable signal En is at the L level.

In this way, by setting the second clock signal $\phi 2$ to the H level or the L level, the light-emitting thyristor Li is controlled whether or not to emit light.

Hereinabove, the operations of #1 and #3 of the light-emitting element chips 51, which belong to the A group, in the light-emitting element head 90 has been described.

The difference between #1 and #3 of the light-emitting element chips 51 is in that each period during which the first light-emission enable signal En1 is at the L level is provided to be displaced from the corresponding period during which the second light-emission enable signal En2 is at the L level in terms of time.

Meanwhile, each second clock signal $\phi 2$ is a data sequence in which the periods of being either at the L level or the H level are provided in time-series order in accordance with instruction datasets to emit light or not to emit light for the multiple light-emitting element chips 51 belonging to the same group. For example, suppose the case of causing both the light-emitting thyristors L1 respectively of #1 and #3 of the light-emitting element chips 51 to emit light in the period T(L1) for controlling the light-emitting operation of the light-emitting thyristors L1 of #1 and #3. In this case, the 2_1-th clock signal $\phi 2\_1$ is provided with periods of being at the L level respectively in the period during which the first light-emission enable signal En1 is at the L level, and in the period during which the second light-emission enable signal En2 is at the L level. Alternatively, suppose the case of causing the light-emitting thyristor L1 of #1 of the light-emitting element chips 51 to emit light while causing the light-emitting thyristor L1 of #3 of the light-emitting element chips 51 not to emit light. In this case, the 2_1-th clock signal $\phi 2\_1$ is provided with a period of being at the L level in the period during which the first light-emission enable signal En1 is at the L level, but the 2_1-th clock signal φ2_1 remains set to the H level even in the period during which the second light-emission enable signal En2 is at the L level. Still alternatively, suppose the case of causing the light-emitting thyristor L1 of #1 of the light-emitting element chips 51 not to emit light while causing the light-emitting thyristor L1 of #3 of the light-emitting element chips 51 to emit light. In this case, the 2_1-th clock signal φ2_1 remains set to the H level even in the period during which the first light-emission enable signal En1 is at the L level, but the 2_1-th clock signal φ2_1 is provided with a period of being at the L level in the period during which the second light-emission enable signal En2 is at the L level. Still alternatively, suppose the case of causing both the light-emitting thyristors L1 respectively of #1 and #3 of the light-emitting element chips 51 not to emit light. In this case, the 2_1-th clock signal φ2_1 remains at the H level even in the period during which the first light-emission enable signal En1 is at the L level, as well as even in the period during which the second light-emission enable signal En2 is at the L level.

In other words, each second clock signal φ2 is provided in time-series order with timings (time points of becoming the L level) each for giving an instruction to emit light or not to emit light to one of the light-emitting thyristors Li that is specified on the basis of the first clock signal φ1.

This allows each of the multiple light-emitting element chips 51 belonging to the same group to receive, from the second clock signal φ2 which is a data sequence, instruction datasets to emit light or not to emit light prepared for the chip in the respective periods during which the light-emission enable signal En supplied to the chip is at the L level. In response, the light-emitting thyristors Li in each of the light-emitting element chips 51 are caused to emit light or not to emit light. Meanwhile, each light-emitting element chip 51 receives none of instruction datasets to emit light or not to emit light prepared for the other one of the light-emitting element chips 51 belonging to the same group by setting the light-emission enable signal En supplied to itself to the H level.

In other words, each light-emission enable signal En functions as windows for allowing the corresponding one of the multiple light-emitting element chips 51 belonging to the same group to receive only the image datasets for the chip from a data sequence of the second clock signal φ2 that gives instructions to emit light or not to emit light to those multiple light-emitting element chips 51 in the same group.

Meanwhile, as has been described above, a light-emitting thyristor Li starts emitting light in response to the transition to the L level of the corresponding second clock signal φ2 for giving instructions to emit light or not to emit light. On the other hand, the light-emitting thyristor Li, which has emitted light, stops emitting light in response to the transition to the H level of the corresponding lighting signal φI.

From this, it may be reasonably said that each second clock signal φ2 functions as a trigger for light-emission of the corresponding light-emitting thyristors Li. This allows parallel control of light-emitting operations of the light-emitting thyristors Li assigned the same number of all the light-emitting element chips 51 belonging to the same group in the corresponding period T(Li). Moreover, by repeating the period T(Li), the light-emitting operations of the light-emitting thyristors Li of all the light-emitting element chips 51 belonging to the same group may be controlled in numerical order while the light-emitting thyristors Li assigned the same number are controlled in parallel.

Moreover, seen from the overall viewpoint of the light-emitting element head 90, all the groups in the light-emitting element head 90 also operate in parallel, as has been described above. Accordingly, the groups in the light-emitting element head 90 are controlled such that the light-emitting thyristors Li assigned the same number of all the light-emitting element chips 51 in the light-emitting element head 90 operate in parallel. This allows the light-emitting element head 90 to provide a high light-emission duty.

Note that each of the periods during which one of the light-emission enable signals En is at the L level needs only to be provided in a manner of allowing selective receipt of a period during which either of the second clock signals p2 being data sequences is at the L level. To be more precise, each of the periods during which one of the light-emission enable signals En is at the L level needs only to be provided so as to allow receipt of a timing when the second clock signal φ2 transitions from the H level to the L level. In other words, in the first exemplary embodiment, when one of the second clock signals φ2 becomes the L level while one of the light-emission enable signals En is at the L level, in the corresponding light-emitting element chip 51, one of the light-emission control thyristors Ci gets turned on, which causes the corresponding light-emitting thyristor Li to be turned on to start emitting light. This is because, once turned on, each light-emitting thyristor Li is made to continue to emit light by the corresponding lighting signal φI.

Thus, a period of being at the L level provided in one of the light-emission enable signals En respectively for the multiple light-emitting element chips 51 belonging to the same group may partially be set to overlap those of the other light-emission enable signals En. Moreover, such a period may be set shorter than a period during which the second clock signal φ2 is at the L level.

Note that, in FIG. 6, the lighting signals φI are configured to allow the light-emitting thyristors Li to have the same-length light-emitting period. For example, in the period T(L1), the lighting signals φI are configured such that the light-emitting period of the light-emitting thyristor L1 of #1 of the light-emitting element chips 51 has the same length as the light-emitting period of the light-emitting thyristor L1 of #3. Here, the former light-emitting period is a period from the time point f when the 2_1-th clock signal φ2_1 transitions from the H level to the L level, to the time point 1 when the first lighting signal φI1 transitions from the L level to the H level. Meanwhile, the latter light-emitting period is a period from the time point i when the 2_1-th clock signal φ2_1 transitions from the H level to the L level, to the time point m when the second lighting signal φI2 transitions from the L level to the H level.

Here, in a group, time points when the respective light-emitting thyristors Li assigned the same number start emitting light are displaced from one another since each second clock signal φ2 is formed of instruction datasets to emit light or not to emit light arranged in time-series order. Accordingly, in order to allow those light-emitting thyristors Li to have the same-length light-emitting period, the light-emitting element chips 51 in the same group are respectively provided with the different lighting signals φI, which specify timings of stopping emitting light in accordance with displacement between the time points of starting emitting light.

Figure 7:
FIG. 7 is a state transition table for explaining the operation of each light-emitting element chip.

FIG. 7 is a state transition table for explaining the operation of each light-emitting element chip 51. Note that FIG. 7 shows state transitions after the transfer thyristor Ti gets turned on in response to the transition to the L level of the first clock signal p1.

Under the condition where the corresponding lighting signal φI and the corresponding light-emission enable signal En are both set to the L level, the light-emission enable thyristor Td does not get turned on. Suppose here the case where the corresponding second clock signal φ2 transitions from the H level to the L level under this condition. In this case, if the light-emitting thyristor Li is turned off, it gets turned on to start emitting light (the time points f and respectively for #1 and #3 in FIG. 6, for example), and, if the light-emitting thyristor Li is turned on, it is kept turned on.

By contrast, even if the second clock signal φ2 transitions from the L level to the H level under the condition where the lighting signal φI and the light-emission enable signal En are both set to the L level, the state of the light-emitting thyristor Li does not change (the time points g and j respectively for #1 and #3).

Meanwhile, if the second clock signal p2 transitions from the H level to the L level under the condition where the lighting signal φI and the light-emission enable signal En are respectively set to the L level and the H level, the light-emission enable thyristor Td gets turned on. In this case, however, if the light-emitting thyristor Li is emitting light, it continues to emit light (the time point i for #1), and, if the light-emitting thyristor Li is emitting no light, it continues to emit no light (the time point f for #3). By contrast, if the second clock signal φ2 then transitions from the L level to the H level under the condition where the lighting signal φI and the light-emission enable signal En are respectively set to the L level and the H level, the light-emission enable thyristor Td gets turned off. In this case as well, if the light-emitting thyristor Li is emitting light, it continues to emit light (the time point j for #1), and, if the light-emitting thyristor Li is emitting no light, it continues to emit no light (the time point g for #3).

Note that, as long as the lighting signal φI is at the H level, none of the light-emitting thyristor Li emits light regardless of the states of the light-emission enable signal En and the second clock signal φ2.

Figure 8:
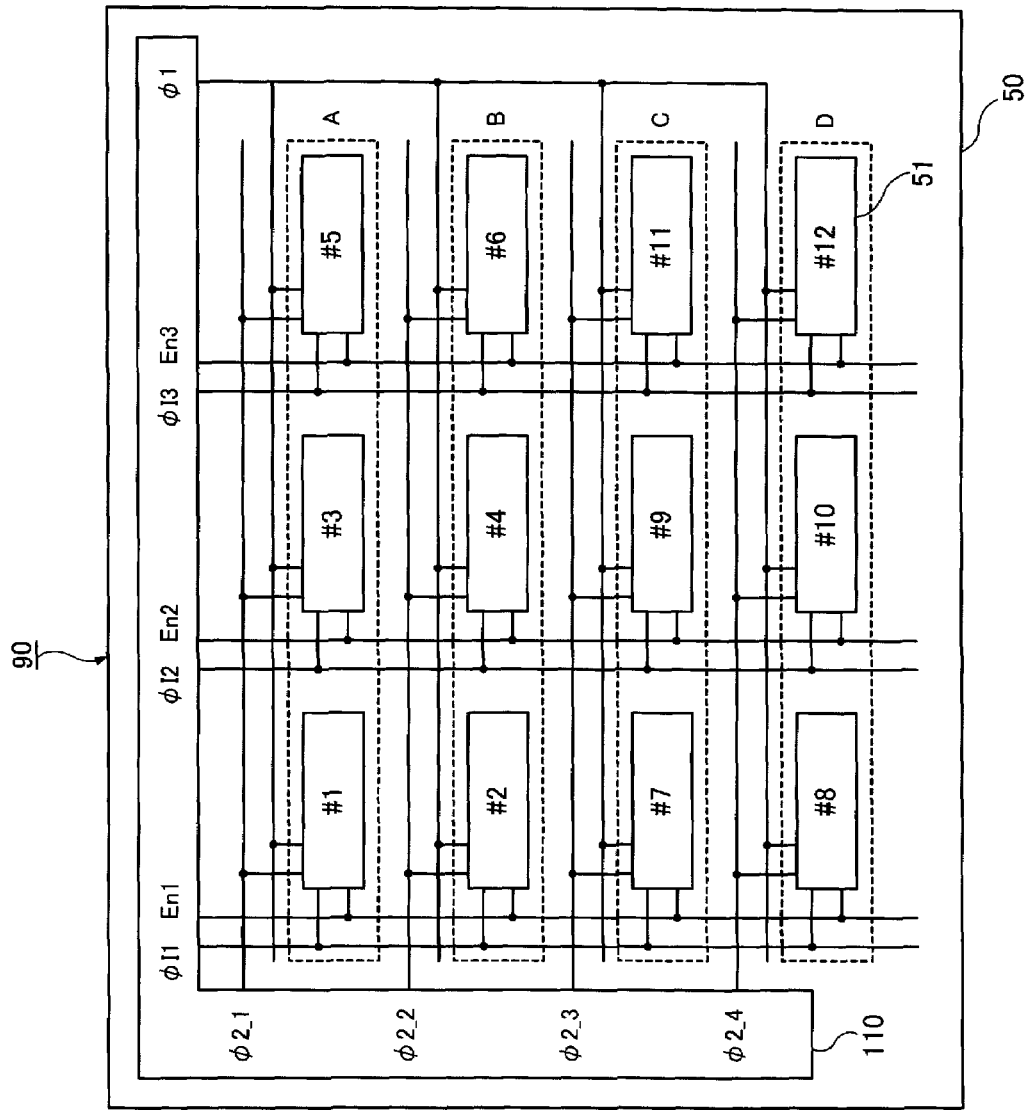
FIG. 8 is a circuit diagram of the light-emitting element head by dividing the light-emitting element chips into groups each formed of 3 light-emitting element chips.

FIG. 8 is a circuit diagram of the light-emitting element head 90 by dividing the light-emitting element chips 51 into groups each formed of 3 chips (#1, #3 and #5 in FIG. 3B, for example). FIG. 8 shows an example in which the light-emitting element head 90 has twelve light-emitting element chips 51 (#1 to #12), which are divided into four groups (A to D) each formed of 3 chips. As in FIG. 4, FIG. 8 shows the light-emitting element chips 51 rearranged in a matrix with the connection relation of the light-emitting element chips 51 to the signal bus lines maintained. Note that the power supply bus line 209 and the reference voltage bus line 210 are not shown in FIG. 8.

Note that, as in FIG. 3B, in this light-emitting element head 90, the light-emitting element chips 51 may be arrayed in a zigzag pattern, though FIG. 8 shows otherwise, and the signal bus lines may be provided on the basis of the connection relation shown in FIG. 8.

As shown in FIG. 8, four second clock signals φ2 (the 2_1-th clock signal φ2_1, the 2-2-th clock signal φ2_2, the 2_3-th clock signal φ2_3 and the 2_4-th clock signal φ2_4), each of which is supplied in common to the light-emitting element chips 51 belonging to the same group, are used.

Meanwhile, three light-emission enable signals En (the first light-emission enable signal En1, the second light-emission enable signal En2 and a third light-emission enable signal En3) and three lighting signals φI (the first lighting signal φI1, the second lighting signal φI2 and a third lighting signal φI3) are used. Here, the light-emitting element chips 51 belonging to the same group are supplied respectively with the different light-emission enable signals En while supplied respectively with the different lighting signals φI.

The first clock signal φ1 is supplied in common to all the light-emitting element chips 51 in the light-emitting element head 90.

Among the second clock signals p2, the 2_1-th clock signal φ2_1 is supplied in common to the light-emitting element chips 51 belonging to the A group (#1, #3 and #5). Similarly, the 2_2-th clock signal φ2_2 is supplied in common to the light-emitting element chips 51 belonging to the B group (#2, #4 and #6). In addition, the 2_3-th clock signal φ2_3 is supplied in common to the light-emitting element chips 51 belonging to the C group (#7, #9 and #11), and the 2_4-th clock signal φ2_4 is supplied in common to the light-emitting element chips 51 belonging to the D group (#8, #10 and #12).

Among the lighting signals φI and the light-emission enable signals En, the first lighting signal φI1 and the first light-emission enable signal En1 are supplied in common to #1, #2, #7 and #8, which respectively belong to the different groups. In addition, the second lighting signal φI2 and the second light-emission enable signal En2 are supplied in common to #3, #4, #9 and #10, which respectively belong to the different groups, while the third lighting signal φI3 and the third light-emission enable signal En3 are supplied in common to #5, #6, #11 and #12, which respectively belong to the different groups.

Figure 9:
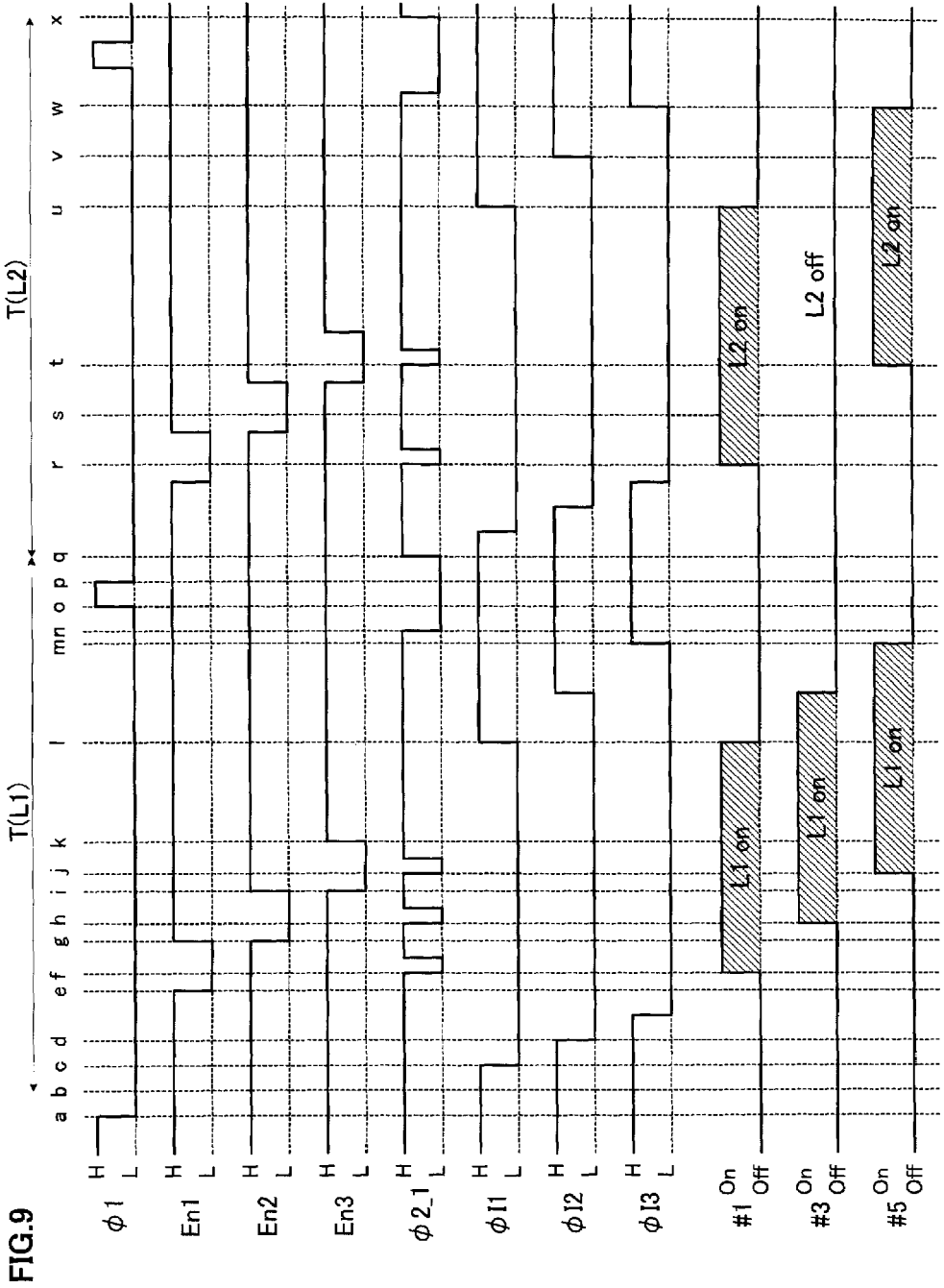
FIG. 9 is a time chart for explaining the operation of one group in each light-emitting element head, by taking, as an example, the group formed of 3 light-emitting element chips.

FIG. 9 is a time chart for explaining the operation of one group in each light-emitting element head 90, by taking, as an example, the A group formed of #1, #3 and #5 of the light-emitting element chips 51. Specifically, FIG. 9 illustrates light-emission control of the two light-emitting thyristors L1 and L2 among all the light-emitting thyristors L1, L2, . . . , provided in each of #1, #3 and #5 of the light-emitting element chips 51.

The operation shown in FIG. 9 is basically the same as that in FIG. 6, and thus will not be described in detail. Each of the first to third lighting signals φI1 to φI3 is configured to have a period of being at the L level in each period during which the first clock signal φ1 is at the L level. Moreover, each of the first to third light-emission enable signals En1 to En3 has periods of being at the L level in the respective periods during which the corresponding one of the first to third lighting signals φI1 to φI3 is at the L level. Here, in each period T(Li), the periods during which the first to third light-emission enable signals En1 to En3 are at the L level are provided to be displaced from one another in terms of time.

Here, the 2_1-th clock signal φ2_1 is a data sequence formed of datasets each indicated by a period of being either at the H level or at the L level, and the datasets are provided to give instructions to emit light or not to emit light to the respective light-emitting thyristors Li of #1, #3 and #5 of the light-emitting element chips 51.

In FIG. 9, in the period T(L1), all the light-emitting thyristors L1 respectively of #1, #3 and #5 of the light-emitting element chips 51 are set to emit light. On the other hand, in the period T(L2), the light-emitting thyristors L2 respectively of #1 and #5 of the light-emitting element chips 51 are set to emit light while the light-emitting thyristors L2 of #3 is set to emit no light.

The detailed operations shown in FIG. 9 are basically the same as that described with reference to FIG. 6, and thus will not be described.

As to the whole light-emitting element head 90, it is only necessary to use the different second clock signals φ2 (the 2_2-th to 2_4-th clock signals φ2_2 to φ2_4) respectively for the B to D groups, which are different from one another, while using the same lighting signals φI (the first to third lighting signals φI1 to φI3) and the same light-emission enable signals En (the first to third light-emission enable signals En1 to En3) for each of those different groups, as has been described above.

Moreover, the light-emitting element chips 51 may be divided into groups each formed of four or more chips, and any number of groups may be employed.

Second Exemplary Embodiment

Figure 10:
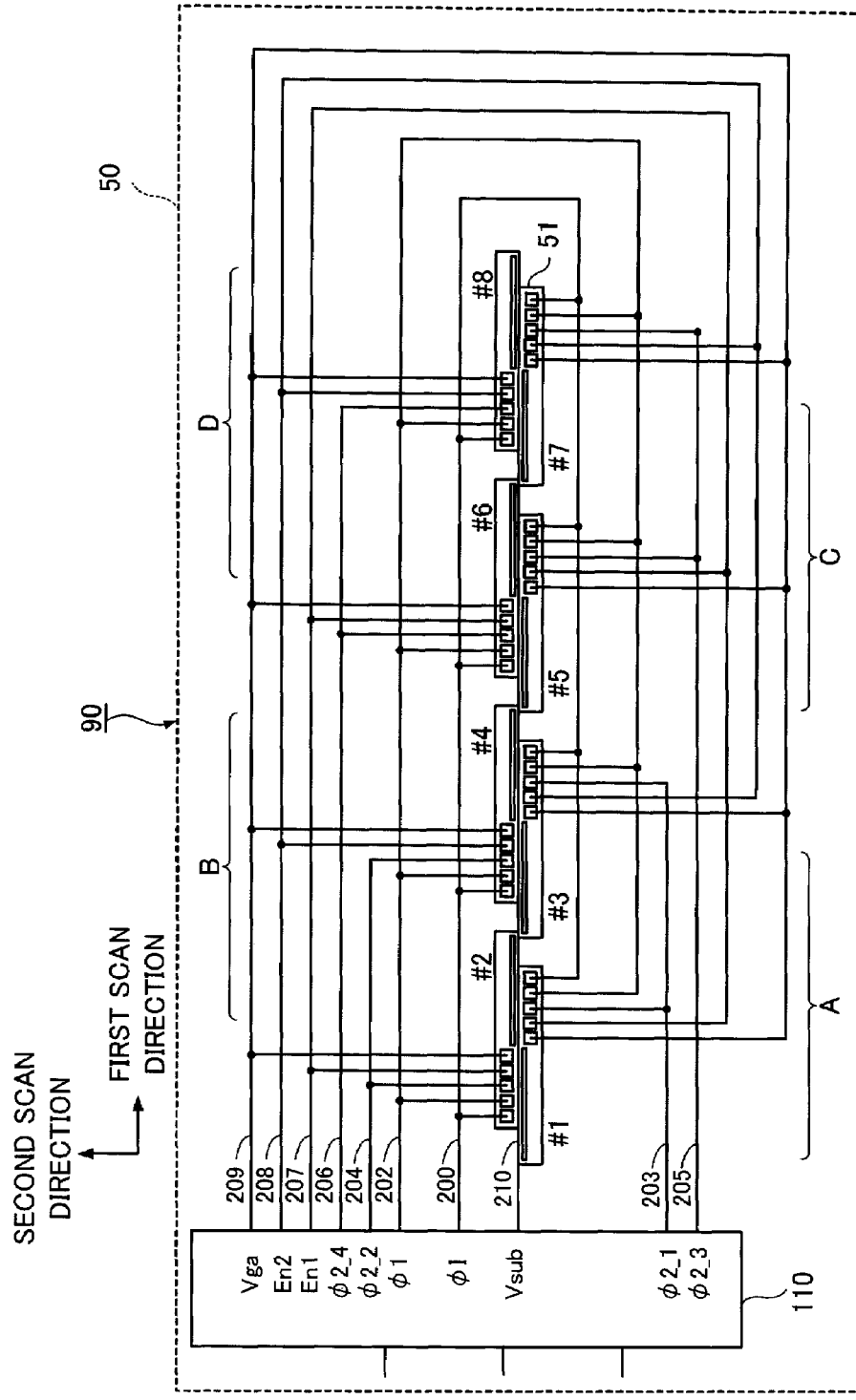
FIG. 10 is a schematic view for explaining a configuration of each light-emitting element head in the second exemplary embodiment.

FIG. 10 is a schematic view for explaining a configuration of each light-emitting element head 90 in the second exemplary embodiment.

As in the first exemplary embodiment, FIG. 10 shows the light-emitting element head 90 having eight light-emitting element chips 51 (#1 to #8), which are divided into four groups (A to D) each formed of two chips, as an example.

The second exemplary embodiment is different from the first exemplary embodiment shown in FIG. 3B in that a single lighting signal φI is used in common in place of the first and second lighting signals φI1 and φI2. Specifically, the lighting signal φI is supplied in common to all the light-emitting element chips 51 through the first lighting signal bus line 200.

Figure 11:
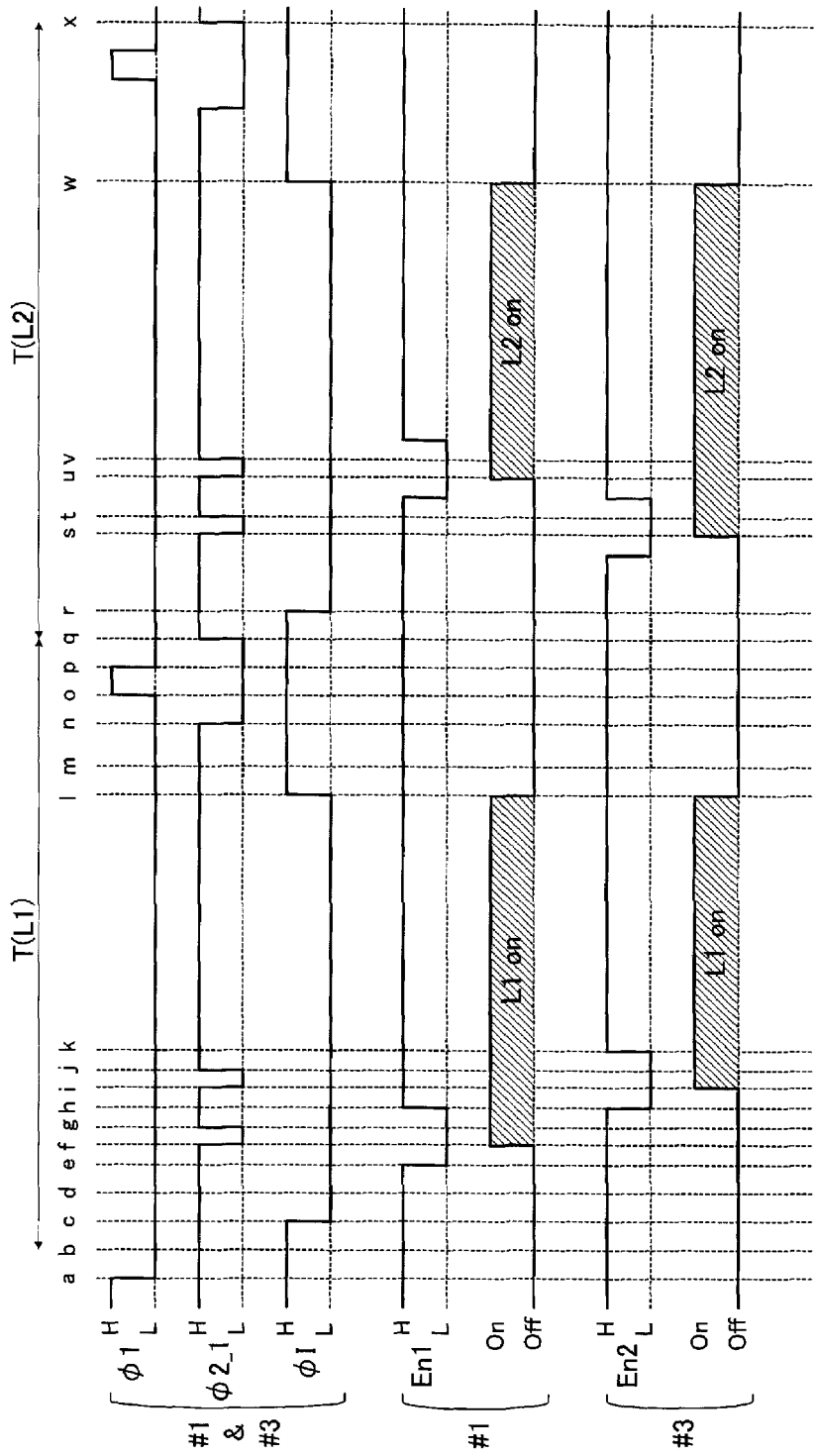
FIG. 11 is a time chart for explaining the operation of one group in each light-emitting element head in the second exemplary embodiment.

FIG. 11 is a time chart for explaining the operation of one group in each light-emitting element head 90 shown in FIG. 10, by taking, as an example, the light-emitting element chips 51 (#1 and #3) belonging to the A group.

The time chart according to the second exemplary embodiment shown in FIG. 11 is different from that according to the first exemplary embodiment shown in FIG. 6 in that the lighting signal φI is supplied in common to all the light-emitting element chips 51.

Hence, in the period T(L1), for example, the light-emitting thyristors L1 respectively of #1 and #3 of the light-emitting element chips 51 simultaneously stop emitting light at the time point l when the lighting signal φI transitions from the L level to the H level. As a result, the light-emitting period (the period from the time point f to the time point l) of the light-emitting thyristor L1 of #1 differs in length from the light-emitting period (a period from the time point i to the time point 1) of the light-emitting thyristor L1 of #3. More specifically, the light-emitting period of the light-emitting thyristor L1 of #1 is longer than that of the light-emitting thyristor L1 of #3.

To compensate for the difference, in the period T(L2), the periods during which the first and second light-emission enable signals En1 and En2 are at the L level, respectively, are provided in the reverse order of that employed in the period T(L1). Specifically, in the period T(L1), the periods during which the first and second light-emission enable signals En1 and En2 are at the L level, respectively, are provided in this order, that is, in order according to the numbers assigned to the light-emitting element chips 51 (#1 and #3), in terms of time. On the other hand, in the period T(L2), the periods during which the second and first light-emission enable signals En2 and En1 are at the L level, respectively, are provided in this order, that is, in the reverse numerical order. As a result, in the period T(L2), the light-emitting period of the light-emitting thyristor L2 of #3 of the light-emitting element chips 51 is longer than that of the light-emitting thyristor L2 of #1.

This allows equalization of average adjacent light-emitting lengths each obtained by averaging the lengths of the light-emitting periods of two light-emitting thyristors that are placed adjacent in the first scan direction shown in FIG. 10, and thus prevents quality deterioration of the image to be formed.

Alternatively, quality deterioration of the image to be formed may be prevented through equalization of average adjacent light-emitting lengths each obtained by averaging the light-emitting periods between two lines that are adjacent in the second scan direction shown in FIG. 10. This equalization is achieved by alternately repeating writing corresponding to two types of lines: one is obtained by providing the periods during which the light-emission enable signals En are at the L level, respectively, in order according to the numbers assigned to the light-emitting element chips 51; the other is obtained by providing the periods during which the light-emission enable signals En are at the L level, respectively, in the reverse numerical order.

Moreover, the former measure of equalization in the first scan direction may be combined with the latter one in the second scan direction.

Each of the above measures is applicable to the light-emitting element head 90 shown in FIGS. 8 and 9 that includes three light-emitting element chips 51 in each group.

Figure 12B:
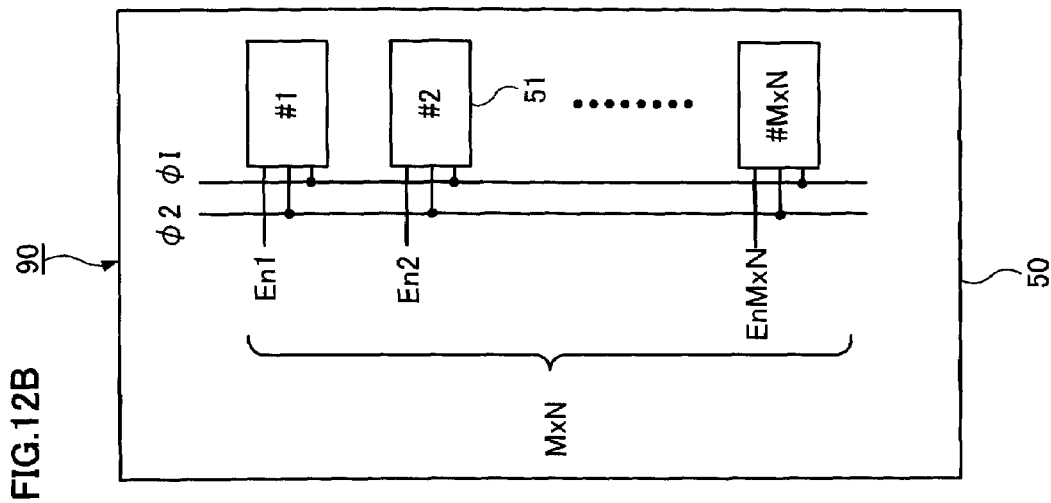
FIGS. 12A and 12B each are a circuit diagram for explaining an effect of reducing the number of signal bus lines in the light-emitting element head in the first exemplary embodiment.
Figure 12A:
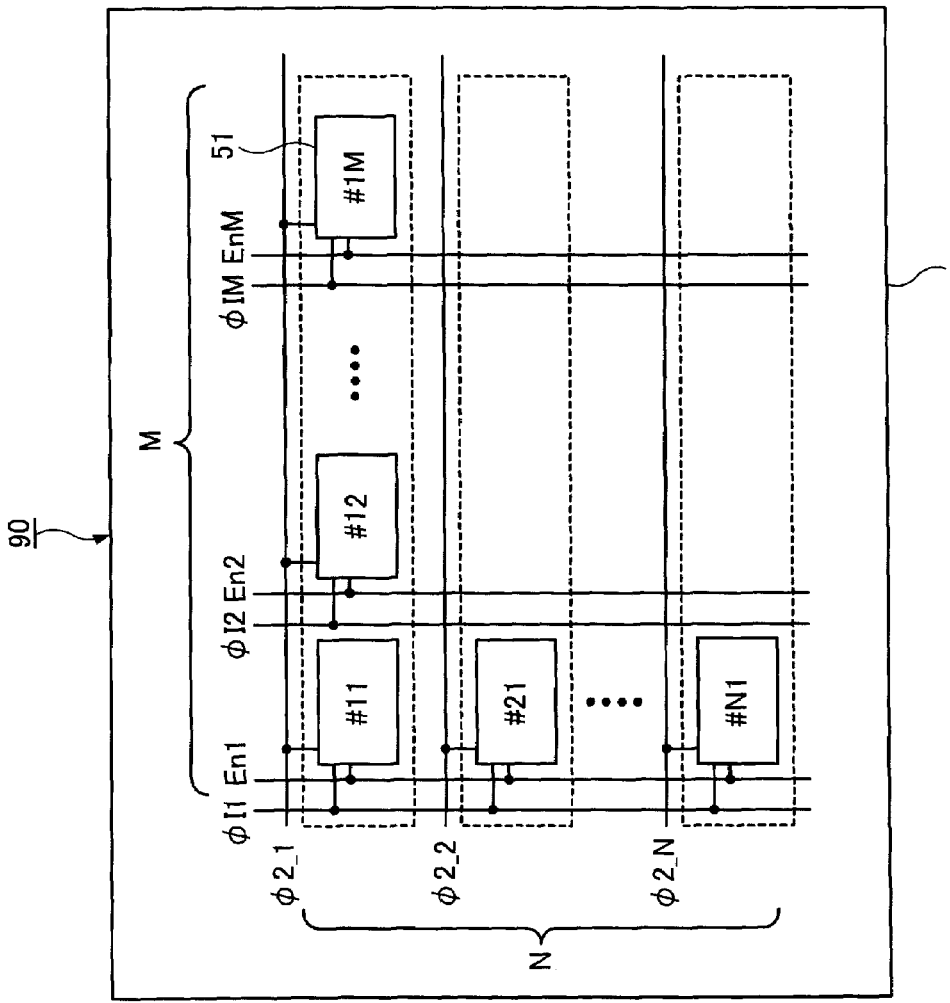

FIGS. 12A and 12B each are a circuit diagram for explaining an effect of reducing the number of signal bus lines in the light-emitting element head 90 in the first exemplary embodiment. Here, a description will be given under the assumption that M×N light-emitting element chips 51 are arrayed, where M and N each are an integer of 1 or more.

FIG. 12A shows the case of driving the M×N light-emitting element chips 51 in groups by dividing the M×N light-emitting element chips 51 into N groups each formed of M chips. FIG. 12B shows the case of driving the M×N light-emitting element chips 51 on a single chip basis. Among the bus lines required to drive the light-emitting element chips 51, FIGS. 12A and 12B show no line used in common for all the light-emitting element chips 51, that is, neither a first clock signal bus line, a power supply bus line nor a reference voltage bus line. In addition, the signal generating circuit 110 is not shown in FIGS. 12A and 12B.

Firstly, a description will be given of the case of FIG. 12A where the M×N light-emitting element chips 51 are driven in groups.

11 to #1M of the light-emitting element chips 51 forms an A group, . . . , and #N1 to #NM of the light-emitting element chips 51 forms an N group.

In the light-emitting element head 90, N different second clock signals φ2 (the 2_1-th to 2_N-th clock signals φ2_1 to φ2_N) are used respectively for the different groups. Here, one of the second clock signals φ2 is supplied in common to the light-emitting element chips 51 belonging to the same group.

Meanwhile, the light-emitting element chips 51 belonging to the same group are supplied with the respective different light-emission enable signals En (the first to M-th light-emission enable signals En1 to EnM) and the respective different lighting signals φI (the first to M-th lighting signals φI1 to φIM).

In this case, the light-emitting operations of all the M×N light-emitting element chips 51 are controlled in parallel, so that all the light-emitting thyristors Li assigned the same number in the respective light-emitting element chips 51 are controlled in parallel.

As FIG. 12A shows, the number of signal bus lines required for supplying the second clock signals φ2 is N, the number of signal bus lines required for supplying the light-emission enable signals En is M, and the number of signal bus lines required for supplying the lighting signals φI is M, too. Accordingly, the total required number of signal bus lines including a first clock signal bus line is 2M+N+1.

Secondly, a description will be given of the case of FIG. 12B where the M×N light-emitting element chips 51 are driven on a single chip basis.

The expression that the light-emitting element chips 51 are driven on a single chip basis indicates a situation where all the light-emitting element chips 51 are caused to operate in numerical order so that a single light-emitting element chip 51 operates at a time, and where the light-emitting thyristors Li in each light-emitting element chip 51 are caused to operate in numerical order. Accordingly, in the case of driving the M×N light-emitting element chips 51 on a single chip basis, a light-emitting operation of one of the light-emitting thyristors Li of one of the light-emitting element chips 51 is controlled at a time. Upon completion of light-emission control of one of the light-emitting thyristors Li of one of the light-emitting element chips 51, light-emission control of the next light-emitting thyristor Li+1 of the light-emitting element chip 51 starts. This procedure is repeated for all the light-emitting element chips 51 in order according to the numbers assigned to the light-emitting element chips 51.

In this case, the second clock signal $\phi 2$ is a data sequence formed of datasets that gives instructions to emit light or not to emit light to the respective light-emitting thyristors Li of the light-emitting element chips 51 in the light-emitting element head 90. Meanwhile, when any of the light-emitting element chips 51 is specified as the light-emission control target, the corresponding light-emission enable signal En is set to the L level. This allows each light-emitting element chip 51 to receive instruction datasets to emit light or not to emit light to the chip when the second clock signal $\phi 2$ reaches the chip while the chip is specified as the light-emission control target. On the other hand, each light-emitting element chip 51 receives none of such instruction datasets to the other chips by setting the corresponding light-emission enable signal En to the H level.

In this case of driving the M×N light-emitting element chips 51 on a single chip basis, a single second clock signal $\phi 2$ and a single lighting signal $\phi I$ are used in common for all the light-emitting element chips 51. However, M×N different light-emission enable signals En, that is, the first to M×N-th light-emission enable signals En1 to EnM×N, are used respectively for the light-emitting element chips 51. Accordingly, the required number of light-emission enable signal bus lines is M×N, and thus the total required number of signal bus lines including first and second clock signal bus lines and a lighting signal bus line is M×N+3.

Hence, the number of signal bus lines is reduced in the case of driving the M×N light-emitting element chips 51 in groups as compared to the case of driving the M×N light-emitting element chips 51 on a single chip basis by M×N−(2M+N)+2.

In the case of FIG. 3B where the light-emitting element head 90 has eight light-emitting element chips 51 divided into groups each formed of two chips, M is 2 and N is 4, so that the number of signal bus lines is 9. Meanwhile, in the case of driving the eight light-emitting element chips 51 on a single chip basis, the number of signal bus lines is 11. Hence, driving the eight light-emitting element chips 51 in groups leads to reduction of the signal bus lines by two.

In the case where the light-emitting element head 90 has 16 light-emitting element chips 51 divided into groups each formed of two chips, M is 2 and N is 8, so that the number of signal bus lines is 13. Meanwhile, in the case of driving the 16 light-emitting element chips 51 on a single chip basis, the number of signal bus lines is 19. Hence, driving the 16 light-emitting element chips 51 in groups leads to reduction of the signal bus lines by six.

In the case where the light-emitting element head 90 has 114 light-emitting element chips 51 divided into groups each formed of two chips, M is 2 and N is 57, so that the number of signal bus lines is 62. Meanwhile, in the case of driving the 114 light-emitting element chips 51 on a single chip basis, the number of signal bus lines is 117. Hence, driving the 114 light-emitting element chips 51 in groups leads to reduction of the signal bus lines by 55. As shown above, the measure of driving the light-emitting element chips 51 in groups leads to reduction of the signal bus lines by approximately half when applied to the light-emitting element head 90 having a large number of the light-emitting element chips 51.

Next, a description will be given of an effect of reducing the number of signal bus lines in the light-emitting element head 90 in the second exemplary embodiment.

In the second exemplary embodiment, in the case of driving the M×N light-emitting element chips 51 in groups shown in FIG. 12A, the common lighting signal $\phi I$ is used in place of the first to M-th lighting signals $\phi I1$ to $\phi IM$. Thus, the number of signal bus lines required for supplying the second clock signals $\phi 2$ is N, the number of signal bus lines required for supplying the light-emission enable signals En is M, and the number of signal bus lines required for supplying the lighting signals $\phi I$ is 1. Accordingly, the total required number of signal bus lines including a first clock signal bus line is M+N+2.

Meanwhile, the case of driving the M× N light-emitting element chips 51 on a single chip basis shown in FIG. 12B is the same as above.

Thus, the number of signal bus lines is reduced in the case of driving the M×N light-emitting element chips 51 in groups as compared to the case of driving the M×N light-emitting element chips 51 on a single chip basis by M×N−(M+N)+1.

In the case of FIG. 10 where the light-emitting element head 90 has eight light-emitting element chips 51 divided into groups each formed of two chips, M is 2 and N is 4, so that the number of signal bus lines is 8. Meanwhile, in the case of driving the eight light-emitting element chips 51 on a single chip basis, the number of signal bus lines is 11. Hence, driving the eight light-emitting element chips 51 in groups leads to reduction of the signal bus lines by three.

In the case where the light-emitting element head 90 has 16 light-emitting element chips 51 divided into groups each formed of two chips, M is 2 and N is 8, so that the number of signal bus lines is 12. Meanwhile, in the case of driving the 16 light-emitting element chips 51 on a single chip basis, the number of signal bus lines is 19. Hence, driving the 16 light-emitting element chips 51 in groups leads to reduction of the signal bus lines by seven.

In the case where the light-emitting element head 90 has 114 light-emitting element chips 51 divided into groups each formed of two chips, M is 2 and N is 57, so that the number of signal bus lines is 61. Meanwhile, in the case of driving the 114 light-emitting element chips 51 on a single chip basis, the number of signal bus lines is 117. Hence, driving the 114 light-emitting element chips 51 in groups leads to reduction of the signal bus lines by 56. As shown above, the measure of driving the light-emitting element chips 51 in groups leads to reduction of the signal bus lines by approximately half when applied to the light-emitting element head 90 having a large number of the light-emitting element chips 51.

Both in the first and second exemplary embodiments, the numbers calculated above, such as the number of signal bus lines in the case of driving the light-emitting element chips 51 in groups, may be obtained for any other combination of: the number of the light-emitting element chips 51 belonging to each group; and the number of groups.

Note that FIGS. 12A and 12B are provided in order to illustrate the effect of reducing the number of signal bus lines, and thus the M×N light-emitting element chips 51 are not arrayed in a zigzag pattern therein. However, the light-emitting element head 90 as shown in FIG. 3B may be obtained by arraying the M×N light-emitting element chips 51 in a zigzag pattern, and by providing the signal bus lines on the basis of the connection relation shown in FIG. 12A or 12B.

The number of light-emitting element chips 51 in each group is set to M herein. However, the number of light-emitting element chips 51 belonging to a group may vary among different groups. Alternatively, the number of light-emitting element chips 51 belonging to each group may be less than M.

In the above exemplary embodiments, each light-emitting element chip 51 have a single element set including the light-emitting thyristor array 102, the transfer thyristor array 103, the light-emission control thyristor array 104 and the light-emission enable thyristor Td. However, each light-emitting element chip 51 may have multiple element sets.

Note that each resistor Rp, which is a parasitic resistance in the above exemplary embodiments, may be an additionally provided resister.

Moreover, in the above exemplary embodiments, a description has been given of the case where each of the light-emitting thyristors, the transfer thyristors, the light-emission control thyristors and the light-emission enable thyristor is a three-terminal thyristor having a pnpn structure whose anode electrode is supplied with the reference voltage Vsub. However, if polarities of the circuit are changed, an alternative case may be employed. Specifically, each of the light-emitting thyristors, the transfer thyristors, the light-emission control thyristors and the light-emission enable thyristor may be a three-terminal thyristor having an npnp structure with an anode electrode, a gate electrode and a cathode electrode that is supplied with the reference voltage Vsub.

In the above exemplary embodiments, the first clock signal φ1 is used as a first control signal for sequentially specifying the light-emitting thyristors L1, L2, L3, . . . , as targets for controlling whether or not to emit light, while each second clock signal φ2 is used as a second control signal for giving an instruction to emit light or not to emit light to the light-emitting thyristors specified as the control target. In addition, the second clock signal φ2 is also assigned a role as the first control signal of sequentially specifying the light-emitting thyristors L1, L2, L3, . . . , as targets for controlling whether or not to emit light. However, the first and second control signals are not limited to these. Alternatively, two or more clock signals may be used as first control signals, or a second control signal may be provided as a separate signal from the one or more clock signals.

Moreover, the configuration of each light-emitting element chip 51 is not limited to that shown in FIG. 5, either. The connection relation among the elements such as the light-emitting thyristors, the transfer thyristors, the light-emission control thyristors and the light-emission enable thyristor, as well as the arrangement thereof, may be changed.

In the above exemplary embodiments, the light-emitting element chips 51 are formed of a GaAs-based semiconductor, but the material of the light-emitting element chips is not limited to this. For example, the light-emitting element chips 51 may be formed of another composite semiconductor, such as GaP, difficult to turn into a p-type semiconductor or an n-type semiconductor by ion implantation.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A light-emitting element head, comprising:
a set of light-emitting element chips each having a plurality of light-emitting elements;
a lighting signal supply unit that supplies the set of light-emitting element chips with a lighting signal for causing the plurality of light-emitting elements included in each of the light-emitting element chips to emit light;
a first control signal supply unit that supplies a first control signal in common to the light-emitting element chips, the first control signal being a signal for sequentially specifying the plurality of light-emitting elements included in each of the light-emitting element chips one by one as a control target for controlling whether or not to emit light;
a second control signal supply unit that supplies second control signals to the set of light-emitting element chips so that each of the second control signals is supplied in common to a plurality of light-emitting element chips belonging to each of N groups, each of the second control signals being a signal for giving an instruction to emit light or not to emit light to one of the light-emitting elements that is specified as the control target on the basis of the first control signal in each of the light-emitting element chips, the set of light-emitting element chips being divided into the N groups, where N is an integer of 2 or more; and
a light-emission enable signal supply unit that supplies a plurality of light-emission enable signals to the set of light-emitting element chips so that the light-emission enable signals are supplied respectively to the plurality of light-emitting element chips belonging to each of the N groups, the light-emission enable signals being signals for allowing the set of light-emitting element chips to receive the second control signals, the light-emission enable signals being different from one another.

2. The light-emitting element head according to claim 1, wherein the light-emission enable signal supply unit supplies the plurality of light-emission enable signals which are different from one another to the set of light-emitting element chips so that each of the light-emission enable signals is supplied in common to light-emitting element chips respectively belonging to different groups of the N groups.

3. The light-emitting element head according to claim 1, wherein the lighting signal supply unit supplies a plurality of the lighting signals different from one another respectively to the plurality of light-emitting element chips belonging to each of the N groups while supplying the plurality of lighting signals to the set of light-emitting element chips so that one of the lighting signals is supplied in common to light-emitting element chips respectively belonging to different groups of the N groups.

4. The light-emitting element head according to claim 1, wherein the lighting signal supply unit supplies the lighting signal in common to the set of the light-emitting element chips.

5. The light-emitting element head according to claim 1, wherein
the lighting signal supply unit supplies a lighting signal that alternately transitions between a first potential difference and a second potential difference to the plurality of light-emitting elements, the second potential difference being larger in absolute value than the first potential difference, and
the second control signal supply unit supplies the second control signals each provided with timings each for giving an instruction to emit light or not to emit light to one of the light-emitting elements that is specified as the control target on the basis of the first control signal, the timings being provided in time-series order so as to correspond to the number of the plurality of light-emitting element chips that belong to each of the N groups and being each provided in a period during which the one of the light-emitting elements is specified as the control target, and during which the lighting signal is set to the second potential difference.

6. The light-emitting element head according to claim 5, wherein the light-emission enable signal supply unit supplies the light-emission enable signals respectively to the plurality of light-emitting element chips belonging to each of the N groups at different supply timings, the supply timings respectively corresponding to the timings which are provided in each of the second control signals each for giving the instruction to emit light or not to emit light to the one of the light-emitting elements.

7. The light-emitting element head according to claim 1, wherein each of the light-emitting elements is a thyristor having any one of a pnpn structure and an npnp structure.

8. A light-emitting element head, comprising:
a set of light-emitting element chips each having a plurality of light-emitting elements;
a lighting signal supply unit that supplies the set of light-emitting element chips with a lighting signal for causing the plurality of light-emitting elements included in each of the light-emitting element chips to emit light;
a first control signal supply unit that supplies a first control signal in common to the light-emitting element chips, the first control signal being a signal for sequentially specifying the plurality of light-emitting elements included in each of the light-emitting element chips one by one as a control target for controlling whether or not to emit light;
a second control signal supply unit that supplies second control signals to the set of light-emitting element chips so that each of the second control signals is supplied in common to a plurality of light-emitting element chips belonging to each of N groups, each of the second control signals being a signal for giving an instruction to emit light or not to emit light to one of the light-emitting elements that is specified as the control target on the basis of the first control signal in each of the light-emitting element chips, the set of light-emitting element chips being divided into the N groups, where N is an integer of 2 or more; and
a light-emission enable signal supply unit that supplies a plurality of light-emission enable signals to the set of light-emitting element chips so that each of the light-emission enable signals is supplied in common to light-emitting element chips respectively belonging to different groups of the N groups, the light-emission enable signals being signals for allowing the set of light-emitting element chips to receive the second control signals.

9. The light-emitting element head according to claim 8, wherein the light-emission enable signal supply unit supplies the plurality of light-emission enable signals different from one another respectively to the plurality of light-emitting element chips belonging to each of the N groups.

10. The light-emitting element head according to claim 8, wherein the lighting signal supply unit supplies a plurality of the lighting signals different from one another respectively to the plurality of light-emitting element chips belonging to each of the N groups while supplying the plurality of lighting signals to the set of light-emitting element chips so that one of the lighting signals is supplied in common to light-emitting element chips respectively belonging to different groups of the N groups.

11. The light-emitting element head according to claim 8, wherein the lighting signal supply unit supplies the lighting signal in common to the set of the light-emitting element chips.

12. The light-emitting element head according to claim 8, wherein
the lighting signal supply unit supplies a lighting signal that alternately transitions between a first potential difference and a second potential difference to the plurality of light-emitting elements, the second potential difference being larger in absolute value than the first potential difference, and
the second control signal supply unit supplies the second control signals each provided with timings each for giving an instruction to emit light or not to emit light to one of the light-emitting elements that is specified as the control target on the basis of the first control signal, the timings being provided in time-series order so as to correspond to the number of the plurality of light-emitting element chips that belong to each of the N groups and being each provided in a period during which the one of the light-emitting elements is specified as the control target, and during which the lighting signal is set to the second potential difference.

13. The light-emitting element head according to claim 12, wherein the light-emission enable signal supply unit supplies the light-emission enable signals respectively to the plurality of light-emitting element chips belonging to each of the N groups at different supply timings, the supply timings respectively corresponding to the timings which are provided in each of the second control signals each for giving the instruction to emit light or not to emit light to the one of the light-emitting elements.

14. The light-emitting element head according to claim 8, wherein each of the light-emitting elements is a thyristor having any one of a pnpn structure and an npnp structure.

15. An image forming apparatus, comprising:
a charging unit that charges an image carrier;
an exposure unit that exposes the image carrier thus charged to form an electrostatic latent image by using a light-emitting element head;
a developing unit that develops the electrostatic latent image formed on the image carrier; and
a transfer unit that transfers an image developed on the image carrier onto a transferred body,
the light-emitting element head including:
a set of light-emitting element chips each having a plurality of light-emitting elements;
a lighting signal supply unit that supplies the set of light-emitting element chips with a lighting signal for causing the plurality of light-emitting elements included in each of the light-emitting element chips to emit light;

a first control signal supply unit that supplies a first control signal in common to the light-emitting element chips, the first control signal being a signal for sequentially specifying the plurality of light-emitting elements included in each of the light-emitting element chips one by one as a control target for controlling whether or not to emit light;

a second control signal supply unit that supplies second control signals to the set of light-emitting element chips so that each of the second control signals is supplied in common to a plurality of light-emitting element chips belonging to each of N groups, each of the second control signals being a signal for giving an instruction to emit light or not to emit light to one of the light-emitting elements that is specified as the control target on the basis of the first control signal in each of the light-emitting element chips, the set of light-emitting element chips being divided into the N groups, where N is an integer of 2 or more; and a light-emission enable signal supply unit that supplies a plurality of light-emission enable signals to the set of light-emitting element chips so that the light-emission enable signals are supplied respectively to the plurality of light-emitting element chips belonging to each of the N groups, the light-emission enable signals being signals for allowing the set of light-emitting element chips to receive the second control signals, the light-emission enable signals being different from one another.

16. An image forming apparatus, comprising:

a charging unit that charges an image carrier;

an exposure unit that exposes the image carrier thus charged to form an electrostatic latent image by using a light-emitting element head;

a developing unit that develops the electrostatic latent image formed on the image carrier; and a transfer unit that transfers an image developed on the image carrier onto a transferred body, the light-emitting element head including:

a set of light-emitting element chips each having a plurality of light-emitting elements;

a lighting signal supply unit that supplies the set of light-emitting element chips with a lighting signal for causing the plurality of light-emitting elements included in each of the light-emitting element chips to emit light;

a first control signal supply unit that supplies a first control signal in common to the light-emitting element chips, the first control signal being a signal for sequentially specifying the plurality of light-emitting elements included in each of the light-emitting element chips one by one as a control target for controlling whether or not to emit light;

a second control signal supply unit that supplies second control signals to the set of light-emitting element chips so that each of the second control signals is supplied in common to a plurality of light-emitting element chips belonging to each of N groups, each of the second control signals being a signal for giving an instruction to emit light or not to emit light to one of the light-emitting elements that is specified as the control target on the basis of the first control signal in each of the light-emitting element chips, the set of light-emitting element chips being divided into the N groups, where N is an integer of 2 or more; and a light-emission enable signal supply unit that supplies a plurality of light-emission enable signals to the set of light-emitting element chips so that each of the light-emission enable signals is supplied in common to light-emitting element chips respectively belonging to different groups of the N groups, the light-emission enable signals being signals for allowing the set of light-emitting element chips to receive the second control signals.

17. A signal supply method for a set of light-emitting element chips each having a plurality of light-emitting elements; the signal supply method comprising:

supplying the set of light-emitting element chips with a lighting signal for causing the plurality of light-emitting elements included in each of the light-emitting element chips to emit light;

supplying a first control signal in common to the light-emitting element chips, the first control signal being a signal for sequentially specifying the plurality of light-emitting elements included in each of the light-emitting element chips one by one as a control target for controlling whether or not to emit light;

supplying second control signals to the set of light-emitting element chips so that each of the second control signals is supplied in common to a plurality of light-emitting element chips belonging to each of N groups, each of the second control signals being a signal for giving an instruction to emit light or not to emit light to one of the light-emitting elements that is specified as the control target on the basis of the first control signal in each of the light-emitting element chips, the set of light-emitting element chips being divided into the N groups, where N is an integer of 2 or more; and supplying a plurality of light-emission enable signals to the set of light-emitting element chips so that the light-emission enable signals are supplied respectively to the plurality of light-emitting element chips belonging to each of the N groups, the light-emission enable signals being signals for allowing the set of light-emitting element chips to receive the second control signals, the light-emission enable signals being different from one another.

* * * * *